US008244287B2

(12) United States Patent
Tavassoli Hozouri et al.

(10) Patent No.: US 8,244,287 B2
(45) Date of Patent: Aug. 14, 2012

(54) RADIO AND ANTENNA SYSTEM AND DUAL-MODE MICROWAVE COUPLER

(75) Inventors: Behzad Tavassoli Hozouri, Santa Clara, CA (US); Vasanth Munikoti, Escondido, CA (US); Mahadevan Sridharan, San Jose, CA (US)

(73) Assignee: Z-Communications, Inc., San Diego, CA (US)

( * ) Notice: Subject to any disclaimer, the term of this patent is extended or adjusted under 35 U.S.C. 154(b) by 344 days.

(21) Appl. No.: 12/608,569

(22) Filed: Oct. 29, 2009

(65) Prior Publication Data

US 2011/0105019 A1 May 5, 2011

(51) Int. Cl.
*H04B 7/00* (2006.01)
*H04B 17/00* (2006.01)

(52) U.S. Cl. .................................... 455/500; 455/67.15

(58) Field of Classification Search .................. 455/500, 455/67.15, 67.11, 454, 39, 127.4, 13.3, 279.1, 455/81, 269, 270, 271, 328; 324/76.14
See application file for complete search history.

(56) References Cited

U.S. PATENT DOCUMENTS

| | | | | |
|---|---|---|---|---|
| 2,817,063 | A | 12/1957 | Kurtz | |
| 4,795,993 | A | 1/1989 | Park et al. | |
| 5,003,617 | A * | 3/1991 | Epsom et al. | 455/503 |
| 5,243,357 | A | 9/1993 | Koike et al. | |
| 5,329,285 | A | 7/1994 | McCandless | |
| 6,041,283 | A * | 3/2000 | Sigmar et al. | 702/16 |
| 6,313,714 | B1 | 11/2001 | Junker et al. | |
| 7,053,849 | B1 | 5/2006 | Pike et al. | |

FOREIGN PATENT DOCUMENTS

| | | |
|---|---|---|
| FR | 2760899 | 9/1998 |
| WO | WO 02075839 | 9/2002 |
| WO | WO 03012916 | 2/2003 |
| WO | WO 2004049497 | 6/2004 |

OTHER PUBLICATIONS

Alessandri, Ferdinando; Sorrentino, Roberto; Schioccola, Massimiliano and Vanni, Luca. "Automated Design of a Novel Mode Coupler for Compact Dual Polarization Beam Forming Networks," IEEE MTT-S Digest, pp. 241-244 (1998).

Simmons, Larry D. and Ace III, Floyd L., "Electronics Technician, Nonresident Training Course, vol. 7—Antennas and Wave Propagation," Chapter 2, pp. 2-1 to 2-32. (Naval Education and Training Professional Development and Technology Center, Oct. 1995).

* cited by examiner

*Primary Examiner* — Eugene Yun
(74) *Attorney, Agent, or Firm* — Nelson Mullins Riley & Scarborough, LLP

(57) ABSTRACT

A radio and antenna system has a first microwave radio, second microwave radio, a first antenna and a dual mode coupler that has a first dual mode transmission line extending between a first port and a third port and a second dual mode transmission line extending between a second port and a microwave absorbing termination. The first microwave radio is coupled to the first port. The second microwave radio is coupled to the second port. The antenna is coupled to the third port. The first dual mode transmission line is coupled to the second dual mode transmission line so that microwave signals in either of the first dual mode transmission line and the second dual mode transmission line propagates microwave signals in the other of the first dual mode transmission line and the second dual mode transmission line.

27 Claims, 18 Drawing Sheets

RADIO AND ANTENNA SYSTEM AND DUAL-MODE MICROWAVE COUPLER

BACKGROUND

It has been known in microwave communications systems to simultaneously transmit two signals having polarizations orthogonal to each other or to selectively switch between signals of orthogonal polarization. In order to provide the ability to change polarization of microwave radios driving a common antenna, and to do so for a given radio independently of the other(s), it is known to use respective independent couplers between the radios and the antenna and to connect the independent couplers to the antenna through an ortho-mode transducer.

It has been known to provide a directional coupler capable of operation with two operational modes, propagating simultaneously or alternatively, such as described in Kurtz, U.S. Pat. No. 2,817,063, entitled "Balanced Slot Directional Coupler."

In general, microwave couplers comprise coupled transmission lines. Telecommunications systems widely use waveguide, micro-strip, strip-line and coaxial couplers. One example of a microwave coupler comprises a first elongated waveguide section that is, for example, rectangular or circular in cross-section (transverse to the propagating direction of the electromagnetic wave) and that extends longitudinally in the wave's propagation direction, and a second elongated waveguide section that is also rectangular or circular in cross-section. Assuming a rectangular configuration, the rectangular cross-sectional dimensions of the two waveguide sections may be the same, and the sections are parallel with and adjacent to each other so that they share a common wall. The wall usually defines a single elongated through-slot aligned on the wall's longitudinal center line or a plurality of through-slots that are usually aligned on the wall's longitudinal center line and spaced apart about a quarter wavelength of the electromagnetic wave the coupler propagates. An electromagnetic wave in one of the waveguide sections excites the slots and thereby excites a corresponding electromagnetic wave in the other waveguide section. Such couplers are single-mode couplers when the rectangular cross-section, as is usually the case, does not support orthogonal propagation modes. At sufficiently high frequencies, however, a rectangular waveguide can support two modes. If the polarizations of the two modes are orthogonal to each other, the waveguide could be considered a dual-mode waveguide in such use.

The waveguide sections comprising the coupler can be modified, preferably to a square cross-section or to a rectangular cross-section with appropriate dimensions, as should be understood in this art, so that each section is capable of supporting orthogonal modes. If the slot configuration is also modified so that the row of slots (or elongated single slot) is offset from the center wall's longitudinal center line, and a parallel row of slots (or single slot) is added, for example where the two rows (or two single slots) are disposed symmetrically with respect to the center line, the slots can excite both orthogonal modes from one waveguide section so that both modes propagate in the other waveguide section, as described in Kurtz, U.S. Pat. No. 2,817,063. Because each of the two orthogonal modes in the first waveguide section couples to the same orthogonal mode in the second waveguide section, the first waveguide can simultaneously transmit both orthogonal modes and simultaneously couple both modes to the other waveguide without creating an interfering electromagnetic wave. In this sense, the coupler may be said to electrically isolate the two modes.

In microwave line-of-sight communication links, it is known to connect a single antenna, for example a reflector-type antenna, to a first radio unit and a second radio unit, so that either radio, or both simultaneously, may be used with the same antenna. In some such applications, the second radio is a back-up to the first radio, so that the second radio starts transmitting when the first radio fails to maintain radio communication, until the first radio is replaced. The two radios are connected to the antenna by a single mode coupler, as described above, in which: (a) the first radio is coupled to one end of the first waveguide section, (b) the second radio is coupled to one end of the second waveguide section, on the same end of the coupler as the first radio, (c) the antenna is coupled to the opposing end of the first waveguide section, and (d) the opposing end of the second waveguide section is terminated by a microwave-absorbing element to prevent undesirable microwave reflections Impedance matching is provided at the coupler ports at each radio and at the antenna, as should be understood by those skilled in this art. It is known to have radios operating at different polarizations connect to the same antenna via respective single mode couplers, where the single mode couplers connect to the antenna through an ortho-mode transducer.

It is also known to couple more than two radios to the same antenna, also using single mode coupling.

SUMMARY OF THE INVENTION

In one embodiment, a communication system has a first radio system having a first microwave radio, a second microwave radio, and a first antenna. A first dual mode coupler has a first dual mode transmission line extending between a first port and third port and a second dual mode transmission line extending between a second port and a microwave absorbing termination. A first microwave radio is coupled to the first port so that the first microwave radio is operable to at least one of outputting microwave signals into and receiving microwave signals from the first dual mode transmission line by the first port. The second microwave radio is coupled to the second port so that the second microwave radio is operable to at least one of outputting microwave signals into and receiving microwave signals from the second transmission line by the second port. The first antenna is coupled to the third port so that the first antenna is operable to at least one of outputting microwave signals into and receiving microwave signals from the first dual mode transmission line by the third port. The first dual mode transmission line is coupled to the second dual mode transmission line so that microwave signals in either of the first dual mode transmission line and the second dual mode transmission line propagates microwave signals in the other of the first dual mode transmission line and the second dual transmission line. A second radio system has a third microwave radio and a second antenna coupled to the third microwave radio. The first radio system and the second radio system are disposed in a geographic area so that one of the first antenna and second antenna radiates microwave radiation to the other of the first antenna and the second antenna.

In another embodiment, a radio and antenna system has a first microwave radio, a second microwave radio, and an antenna, and a dual mode coupler. The dual mode coupler has a first end, a second end opposite the first end, a first side extending between and generally transverse to the first end and the second end, a second side opposite the first side and extending between and generally transverse to the first end and the second end, a first port, a second, a third port, a first dual mode transmission line extending between the first port and the third port, and a second dual mode transmission line extending between the second port and a microwave absorbing termination. The first port is defined at the first side. The third port is defined in the second end. The second port is defined in the second side. The first microwave radio is coupled to the first port so that the first microwave radio is operable to at least one of outputting microwave signals into and receiving microwave signals from the first dual mode transmission line by the first port. The antenna is coupled to the third port so that the antenna is operable to at least one of outputting microwave signals into and receiving microwave signals from the first dual mode transmission line by the third port. The second microwave radio is coupled to the second port so that the second microwave radio is operable to at least one of outputting microwave signals into and receiving microwave signals from the second dual mode transmission line by the second port. The first dual mode transmission line is coupled to the second dual mode transmission line so that microwave signals in either of the first dual mode transmission line and the second dual mode transmission line propagates microwave signals in the other of the first dual mode transmission line and the second dual mode transmission line.

In another embodiment, a dual mode coupler for use in a radio and antenna system having a first microwave radio, a second microwave radio, and an antenna has a first end, a second end opposite the first end, a first side extending between and generally transverse to the first end and the second end, a second side opposite the first side and extending between and generally transverse to the first end and the second end, a first port at which microwave signals are receivable from or conveyable to the first microwave radio, a second port at which microwave signals are receivable from or conveyable to the second microwave radio, a third port at which microwave signals are receivable from or conveyable to the antenna, a first dual mode transmission line extending between the first port and the third port, and a second dual mode transmission line extending between the second port and a microwave absorbing termination. The first port is defined in the first side. The third port is defined in the second end. The second port is defined in the second side. The first dual mode transmission line is coupled to the second dual mode transmission line so that microwave signals in either of the first dual mode transmission line and the second mode transmission line propagates microwave signals in the other of the first dual mode transmission line and the second dual mode transmission line.

In another embodiment, a radio and antenna system has a first microwave radio, a second microwave radio, an antenna, and a dual mode coupler. The dual mode coupler has a first dual mode transmission line extending between a first port and a third port and a second dual mode transmission line extending between a second port and a microwave absorbing termination. The second dual mode transmission line has a first elongated section between the second port and a bend in the second dual mode transmission line and a second elongated section between the bend and the microwave absorbing termination. The first microwave radio is coupled to the port so that the first microwave radio is operable to at least one of outputting microwave signals into and receiving microwave signals from the first dual mode transmission line by the first port. The second microwave radio is coupled to the second port so that the second microwave radio is operable to at least one of outputting microwave signals into and receiving microwave signals from the second dual mode transmission line by the second port. The antenna is coupled to the third port so that the antenna is operable to at least one of outputting microwave signals into and receiving microwave signals from the first dual mode transmission line by the third port. The first dual mode transmission line is coupled to the second dual mode transmission line so that microwave signals in either of the first dual mode transmission line and the second dual mode transmission line propagates microwave signals in the other of the first dual mode transmission line and the second dual mode transmission line.

In another embodiment, a dual mode coupler for use in a radio and antenna system having a first microwave radio, a second microwave radio, and an antenna has a first port at which microwave signals are receivable from or conveyable to the first microwave radio, a second port at which microwave signals are receivable from or conveyable to the second microwave radio, a third port at which microwave signals are receivable from or conveyable to the antenna, a first dual mode transmission line extending between the first port and the third port, and a second dual mode transmission line extending between the second port and a microwave absorbing termination. The second dual mode transmission line comprises a first elongated section between the second port and a bend in the second dual mode transmission line and a second elongated section between the bend and the microwave absorbing termination. The first dual mode transmission line is coupled to the second dual mode transmission line so that microwave signals in either of the first dual mode transmission line and the second dual mode transmission line propagates microwave signals in the other of the first dual mode transmission line and the second dual mode transmission line.

BRIEF DESCRIPTION OF THE DRAWINGS

A full and enabling disclosure of the present invention, including the best mode thereof to one of the skill in the art, is set forth more particularly in the remainder of the specification, which makes reference to the accompanying figures, in which.

Figure 1A:
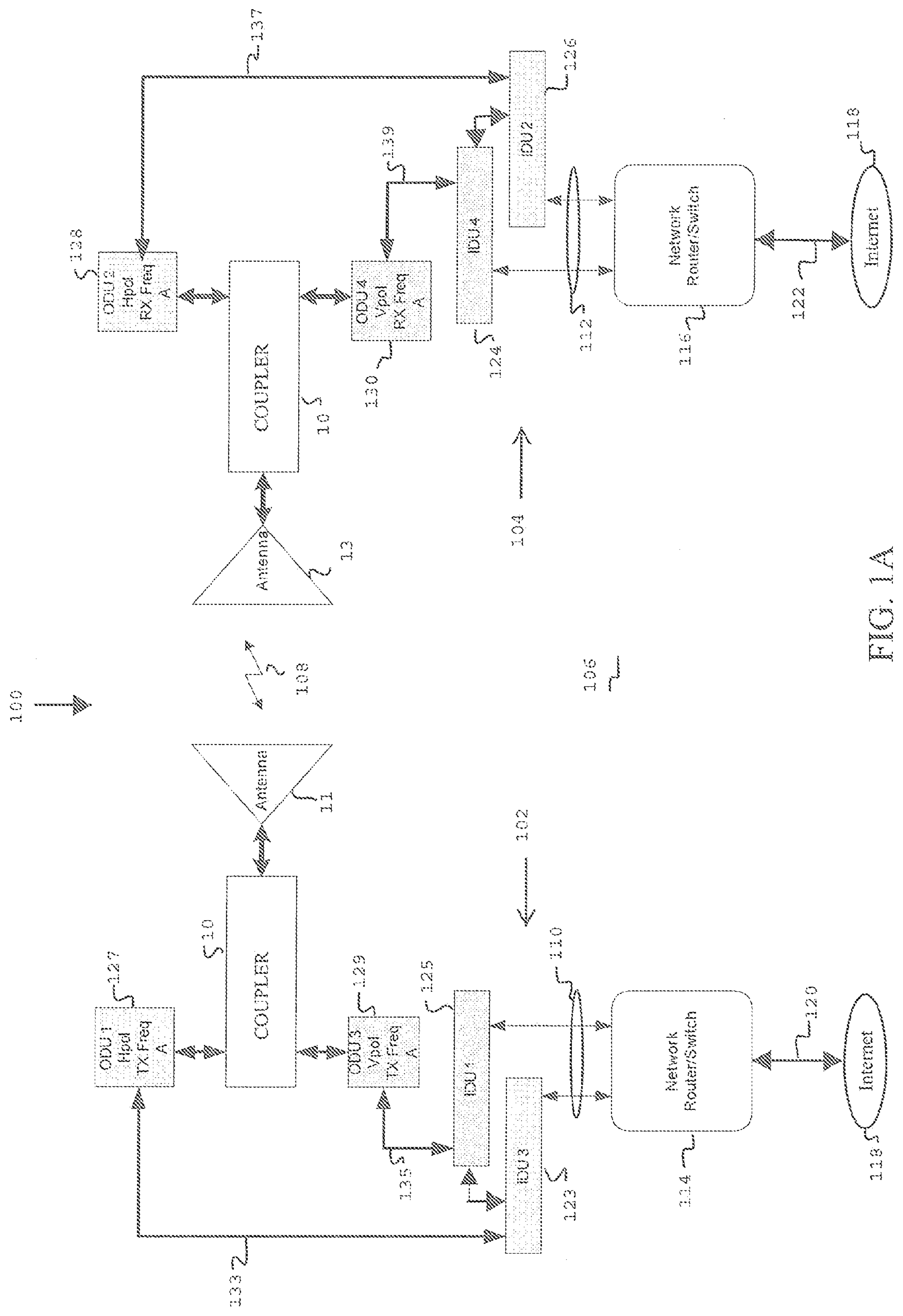
FIG. 1A is a schematic illustration of a communication system in accordance with an embodiment of the present invention.

Repeat use of reference characters in the present specification and drawings is intended to represent same or analogous features or elements of one or more embodiments of the present disclosure.

DETAILED DESCRIPTION

Reference will now be made in detail to certain embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the present disclosure, including the appended claims.

An exemplary schematic illustration of a line-of-sight point-to-point wireless system 100 is shown in FIG. 1A, in which a first radio system 102 and a second radio system 104, both located in a geographic area 106, communicate with each other via microwave radiation 108. Radio systems 102 and 104 communicate with respective Internet service provider points of presence through wired or wireless backhauls 110 and 112. The ISP points of presence include routers/telco interfaces 114 and 116 that communicate with the Internet 118 through telecommunications connections 120 and 122. Although routers are shown in the figures, this is for purposes of explanation only, and it should be understood that data may be provided by any suitable data source, for example a personal computer or a server.

Radio system 102 includes indoor microwave radio transceiver units 123 and 125 that communicate with outdoor microwave radio transceiver units 127 and 129, respectively, over local transmission lines 133 and 135. Indoor units 123 and 125 communicate with point of presence router 114 over backhaul 110. Router 114, in turn, communicates with the Internet 118 over telecommunications interface 120.

Radio system 104 includes indoor intermediate frequency (IF) transceiver units 124 and 126 that communicate with outdoor microwave radio transceiver units 128 and 130, respectively, over local transmission lines 137 and 139. As should be understood, the indoor units receive data, such as voice, ethernet or video data, and modulate an intermediate signal with such data for output to the outdoor units for transmission. Indoor units 124 and 126 communicate with the point of presence router 116 over backhaul 112. Router 116, in turn, communicates with the Internet 118 over telecommunications interface 122.

Outdoor radio units, for example transceivers, 127, 129, 128 and 130 are mounted on towers or other suitable structures so that antennas 11 and 13 are disposed in geographic area 106 in line-of-sight communication with each other, thereby facilitating communication via microwave radiation 108.

Transceivers 127 and 129 are coupled to antenna 11, and transceivers 128 and 130 are coupled to antenna 13, by respective dual-mode couplers 10, one or more exemplary constructions for which are provided in the discussion below. In the embodiment illustrated in FIG. 1A, assume a system upstream from router 114 sends data in a suitable form, such as packets, to router 114 via the Internet 118 intended for a system upstream from router 116. Router 114 switches the packets to indoor unit 123 over backhaul 110, and indoor unit 123 forwards the packets to outdoor unit 127 over transmission line 133. Transceiver 127 communicates with transceiver 128 via the first coupler 10, antenna 11, microwave radiation 108, antenna 13 and the second coupler 10, at a given frequency. Transceiver 127 provides the signal to the first coupler 10 at a given polarization. That is, the transceiver provides the signal to the first coupler so that the first coupler propagates an electromagnetic wave in a mode having a given orientation. Assume, for purposes of example, that the mode's orientation is horizontal. Transceiver 128 receives the packets and forwards them to indoor unit 126 via transmission line 137. Indoor unit 126 forwards the packets to router 116, which switches the messages to the desired upstream system via the Internet 118.

Router 114 may also switch such packets to indoor unit 125, again over backhaul 110. Indoor unit 125 forwards the packets to outdoor unit 129 over transmission line 135. Transceiver 129 communicates with transceiver 130 via the first coupler 10, antenna 11, microwave radiation 108, antenna 13 and the second coupler 10, at the same frequency at which transceiver 127 operates, but transceiver 129 provides the signal to first coupler 10 at a polarization orthogonal to the polarization at which transceiver 127 provides signals to the coupler, in this instance vertical. Transceiver 130 receives the packets and forwards them to indoor unit 124 via transmission line 139. Indoor unit 124 forwards the packets to router 116, which switches the packets to the desired upstream system via the Internet 118.

Because transceivers 127 and 129 provide signals to the first coupler 10 in respective polarizations that are orthogonal to each other, and because the first coupler 10 couples the orthogonally-polarized signals to antenna 11 with negligible (e.g. less than −40 dB) electrical interference such that the coupler may be considered to couple electromagnetic signals to the antenna in electrical isolation, transceivers 127 and 129 may simultaneously drive antenna 11 through first coupler 10, over the same frequency. Similarly, the second coupler 10 simultaneously couples the orthogonally polarized received signals to transceivers 128 and 130. Transceiver 128 is configured to receive horizontally polarized signals, and so receives the signals that originated from transceiver 127 but not those from transceiver 129. Transceiver 130 is configured to receive vertically polarized signals, and so receives the signals that originated from transceiver 129 but not those from transceiver 127. As should be understood, the systems may operate in the reverse direction, so that radio system 104 transmits to radio system 102, in the same manner Because transceivers 127 and 129 simultaneously transmit (or receive), and transceivers 128 and 130 simultaneously receive (or transmit), on the same frequency but orthogonal polarizations, system 100 may be described as a co-channel, dual-polarized application.

Figure 1B:
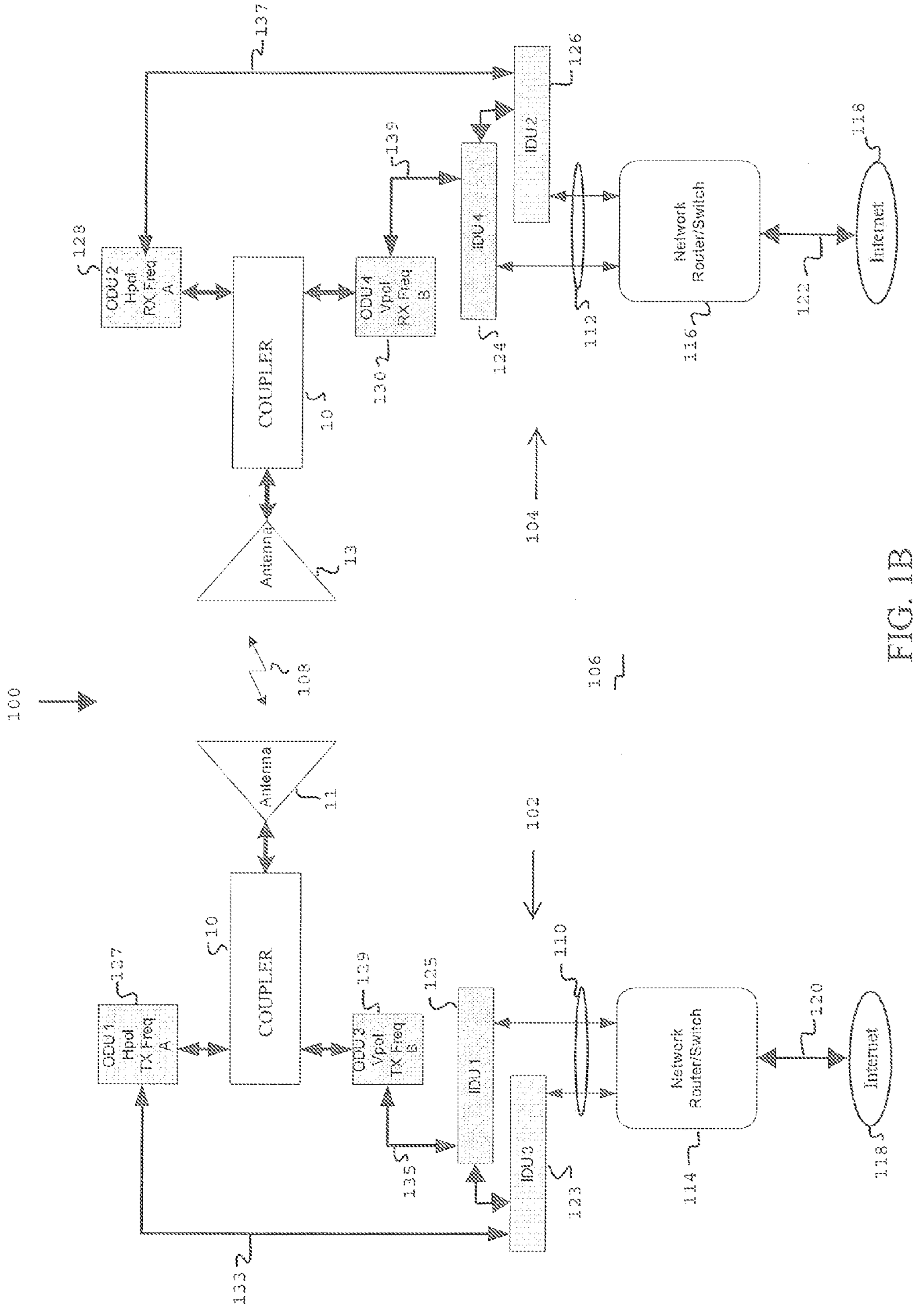
FIG. 1B is a schematic illustration of a communication system in accordance with an embodiment of the present invention.

The components of wireless system 100 shown in FIG. 1B are the same as in the embodiment described with regard to FIG. 1A, and the description of the components is therefore not repeated. The operation of the system components is the same as described above with regard to FIG. 1A, except that transceivers 127 and 129 simultaneously transmit (or receive), and transceivers 128 and 130 simultaneously receive (or transmit), at different frequencies. The frequency range at which transceiver 127 communicates with transceiver 128 is preferably adjacent (the frequency ranges are near each other but have some separation) the frequency range at which transceiver 129 communicates with transceiver 130. Thus, this system may be described as an adjacent channel dual-polarized application.

Figure 1C:
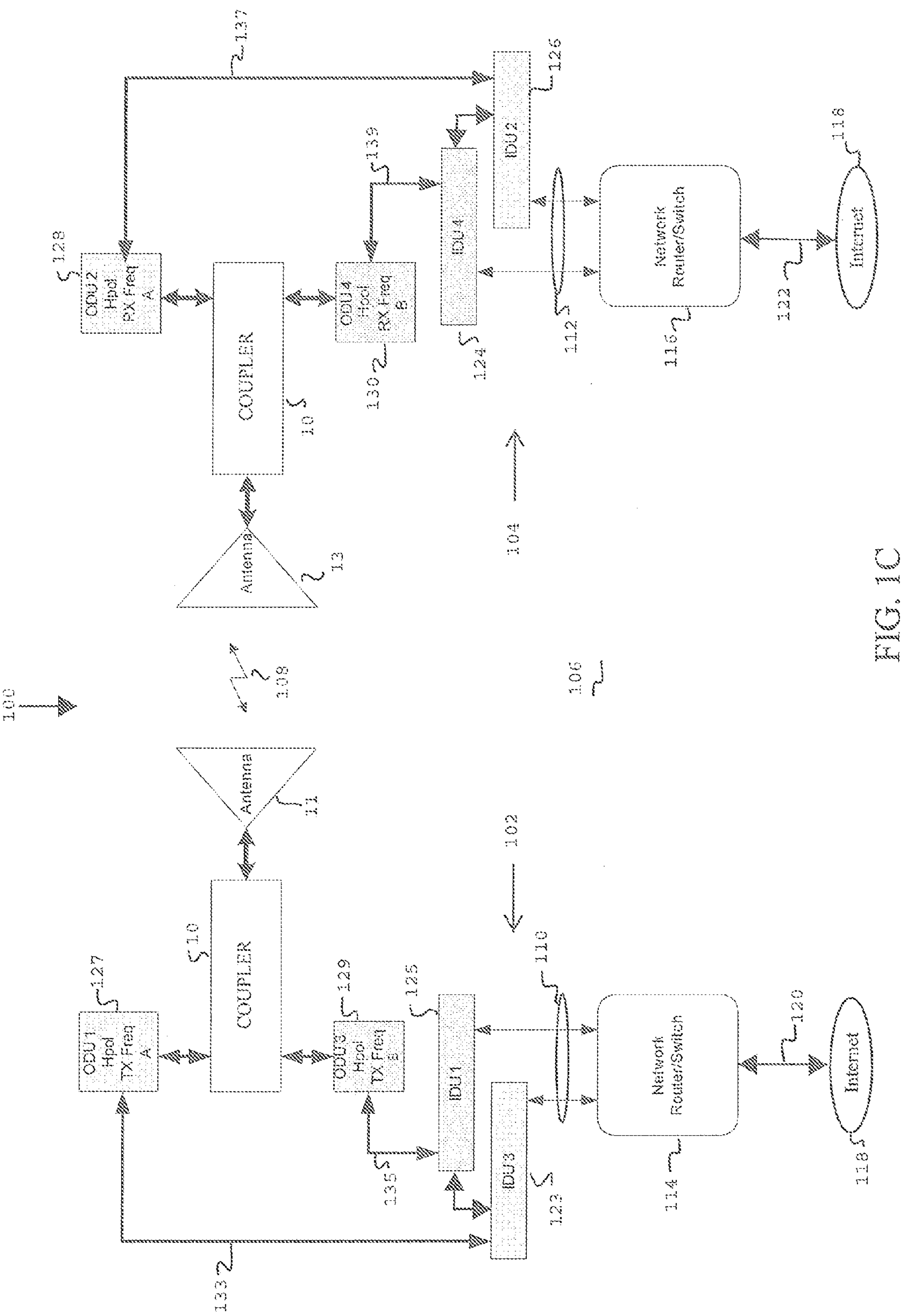
FIG. 1C is a schematic illustration of a communication system in accordance with an embodiment of the present invention.

The components of wireless system 100 shown in FIG. 1C are the same as in the embodiment described with regard to FIG. 1A, and the description of the components is therefore not repeated. The operation of the system components is the same as described above with regard to FIG. 1A, except that transceivers 127 and 129 simultaneously transmit (or receive), and transceivers 128 and 130 simultaneously receive (or transmit), at different frequencies. The frequency range at which transceiver 127 communicates with transceiver 128 is preferably adjacent the frequency range at which transceiver 129 communicates with transceiver 130. Additionally, transceivers 127, 129, 128 and 130 provide and receive signals from first and second couplers 10 in the same polarization, for example horizontal or vertical. Thus, this system may be described as an adjacent channel co-polarized application.

Figure 1D:
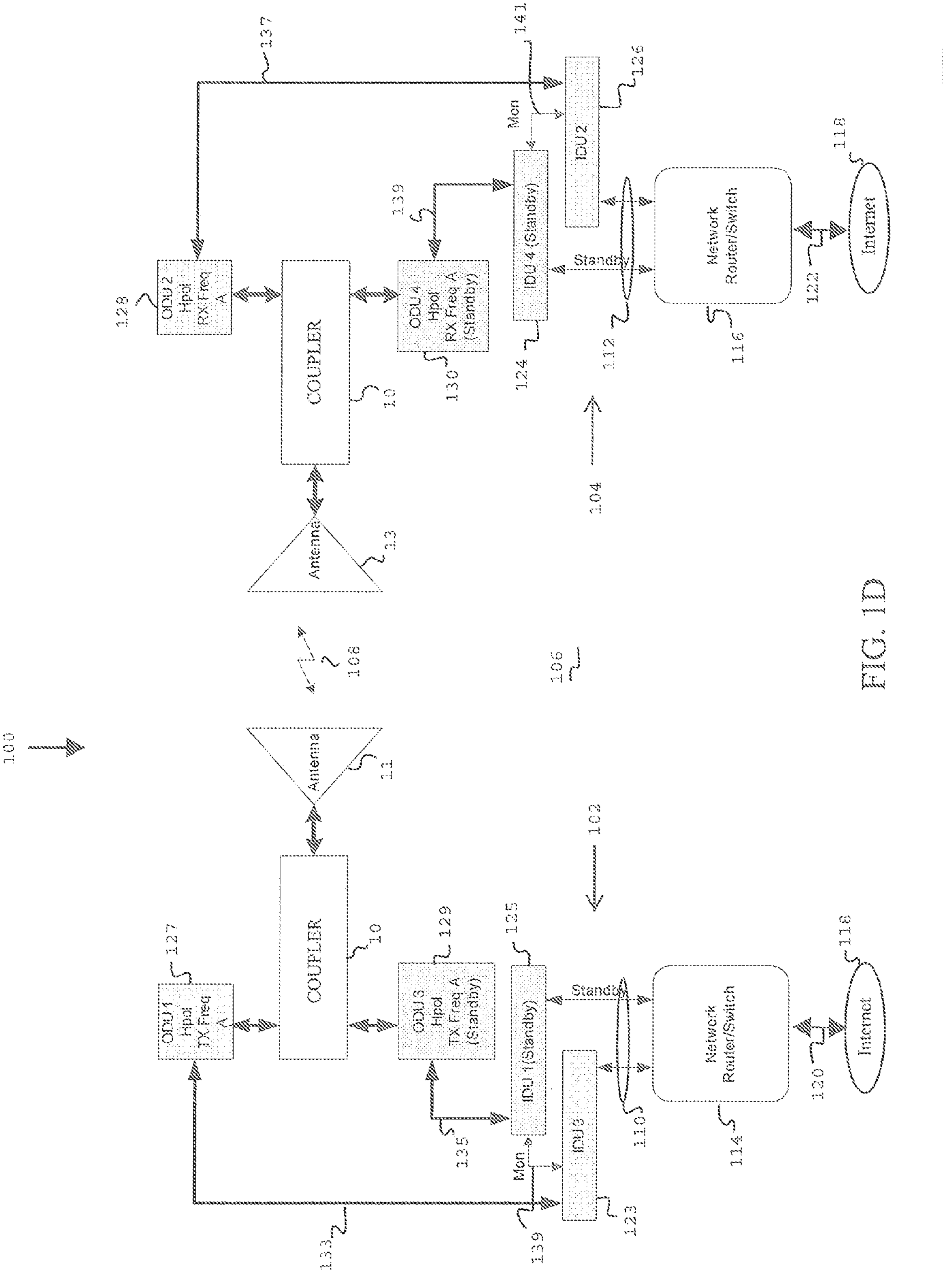
FIG. 1D is a schematic illustration of a communication system in accordance with an embodiment of the present invention.

The components of wireless system 100 shown in FIG. 1D are the same as in the embodiment described with regard to FIG. 1A, and the description of the components is therefore not repeated. The operation of the system components is the same as described above with regard to FIG. 1A, except that transceiver 129 does not transmit simultaneously with transceiver 127 (the transceivers may simultaneously receive). Instead, router 114 normally drives transceiver 127 through indoor unit 123. Indoor unit 125 monitors the operation of transceiver 127 and indoor unit 123 via communication with indoor unit 123, as indicated at 139. If indoor unit 125 detects a fault with transceiver 127, indoor unit 123 or link 133, such that transceiver 127 no longer transmits (or receives) through first coupler 10, indoor unit 125 sends a notice signal to router 114 through backhaul 110, and router 114 thereafter drives transceiver 129 via indoor unit 125 to communicate with the same receiver with which transceiver 127 had been communicating. Transceiver 129 transmits (or receives) at the same frequency as transceiver 127 and provides/receives signals to and from first coupler 10 with the same polarization as transceiver 127.

Similarly, transceiver 130 does not transmit (or receive) simultaneously with transceiver 128. Router 116 normally drives transceiver 128 through indoor unit 126. Indoor unit 124 monitors the operation of transceiver 128 and indoor unit 126 via communication with indoor unit 126, as indicated at 141. If indoor unit 124 detects a fault with transceiver 128, indoor unit 126 or link 137, such that transceiver 128 no longer transmits (or receives) through second coupler 10, indoor unit 124 sends a notice signal to router 116 through backhaul 112, and router 116 thereafter drives transceiver 130 via indoor unit 124. Transceiver 130 transmits (or receives) at the same frequency as transceiver 128 and provides/receives signals to and from second coupler 10 with the same polarization as transceiver 128. The system shown in FIG. 1D may be described as a 1+1 hot standby application.

Figure 1E:
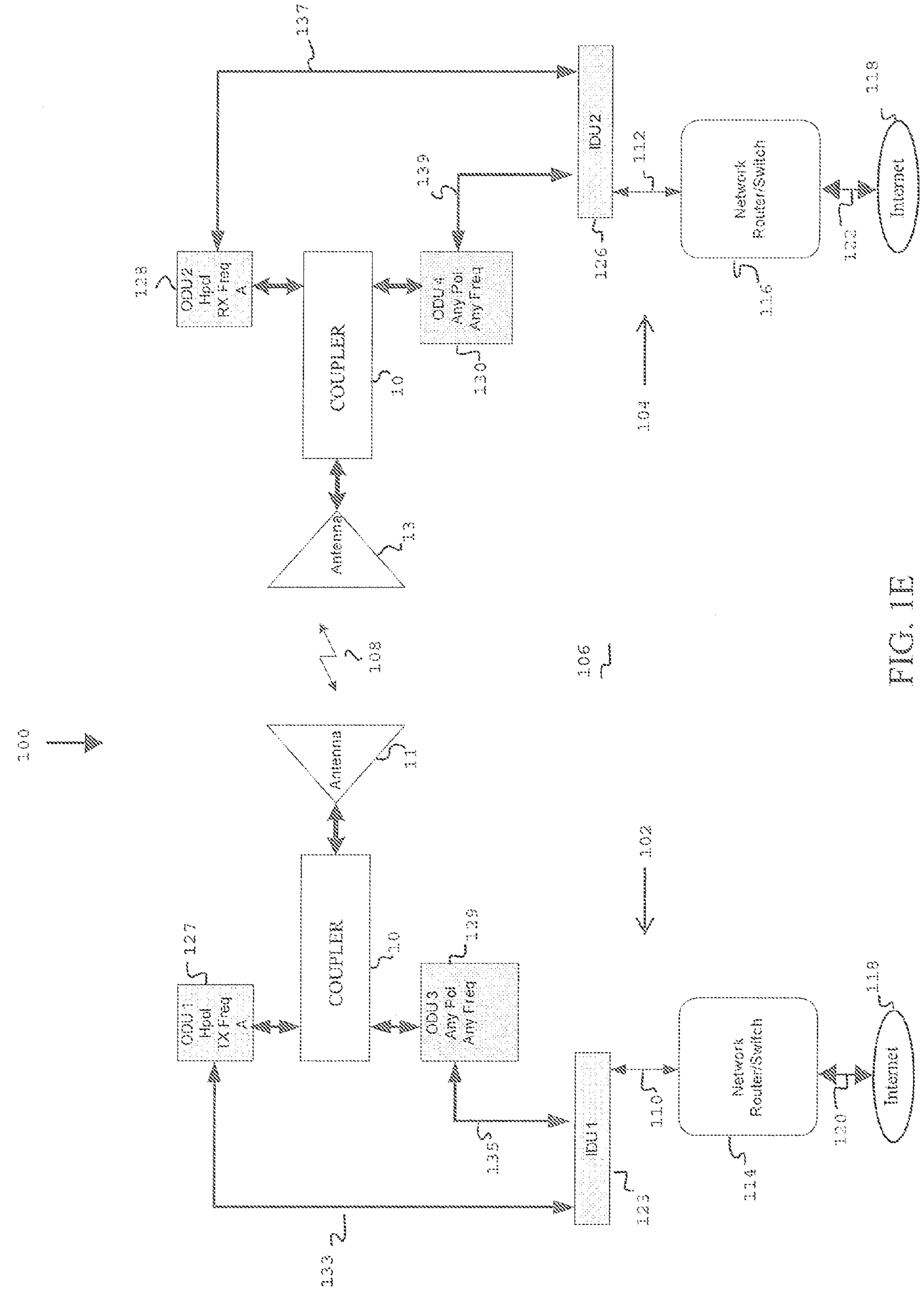
FIG. 1E is a schematic illustration of a communication system in accordance with an embodiment of the present invention.
Figure 2:
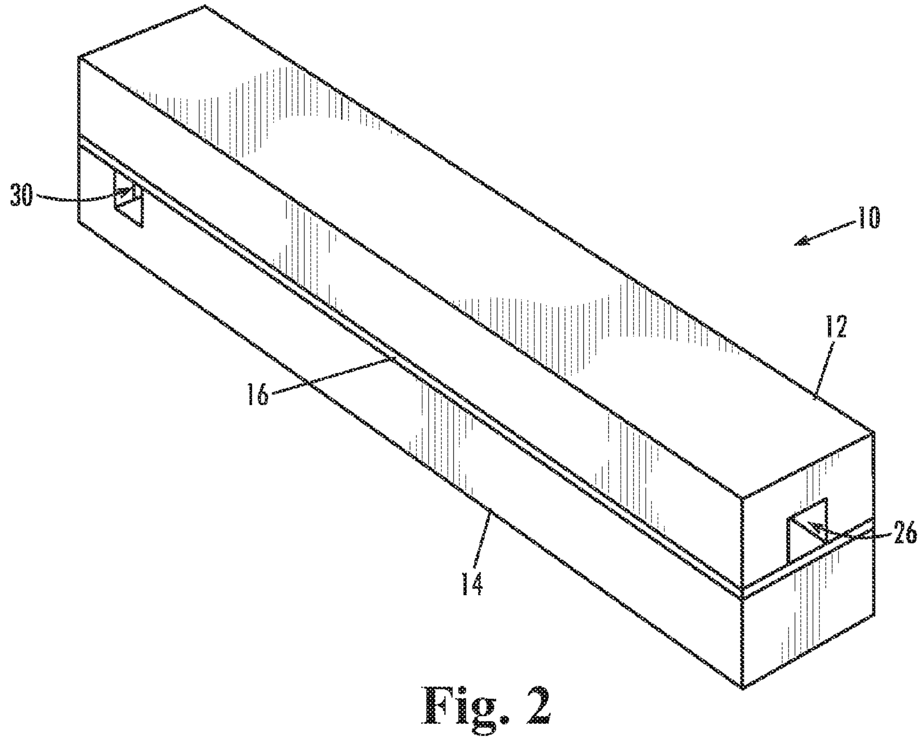
FIG. 2 is a perspective view of a microwave coupler in accordance with one embodiment of the present invention.
Figure 3A:
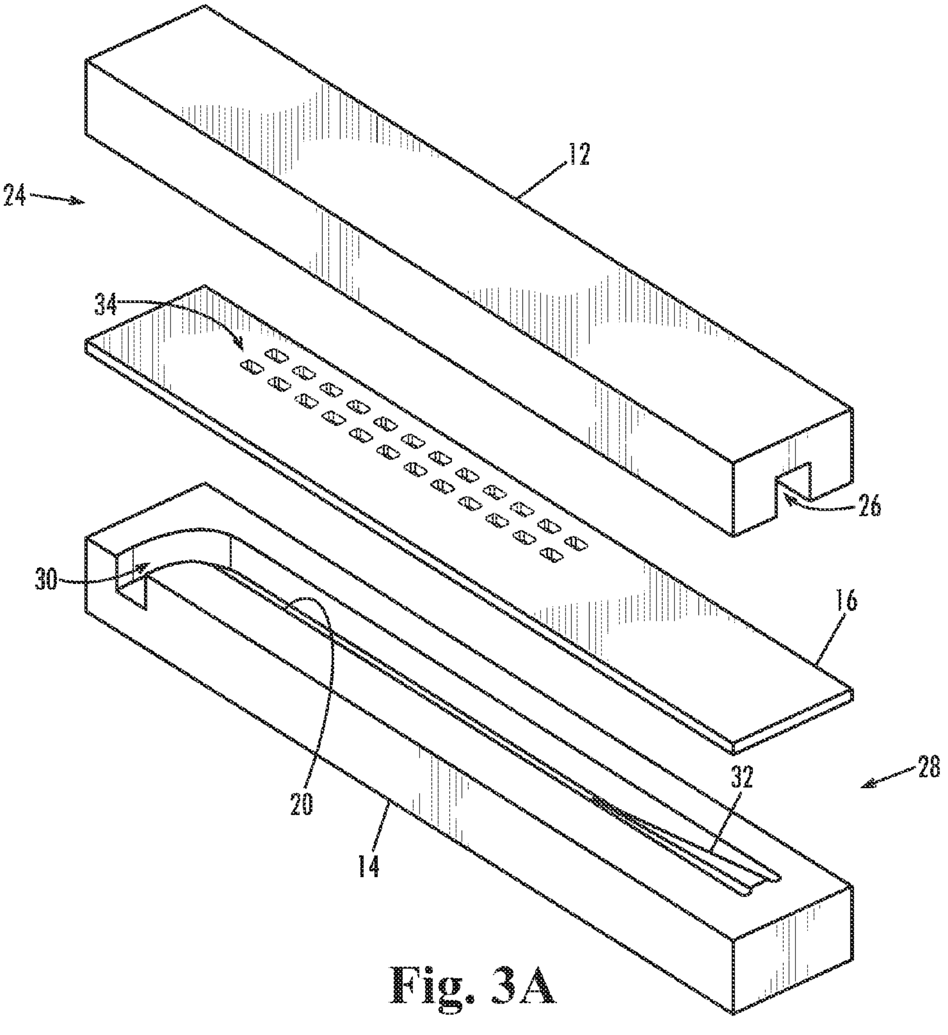
FIG. 3A is an exploded view of the coupler shown in FIG. 1.
Figure 3B:
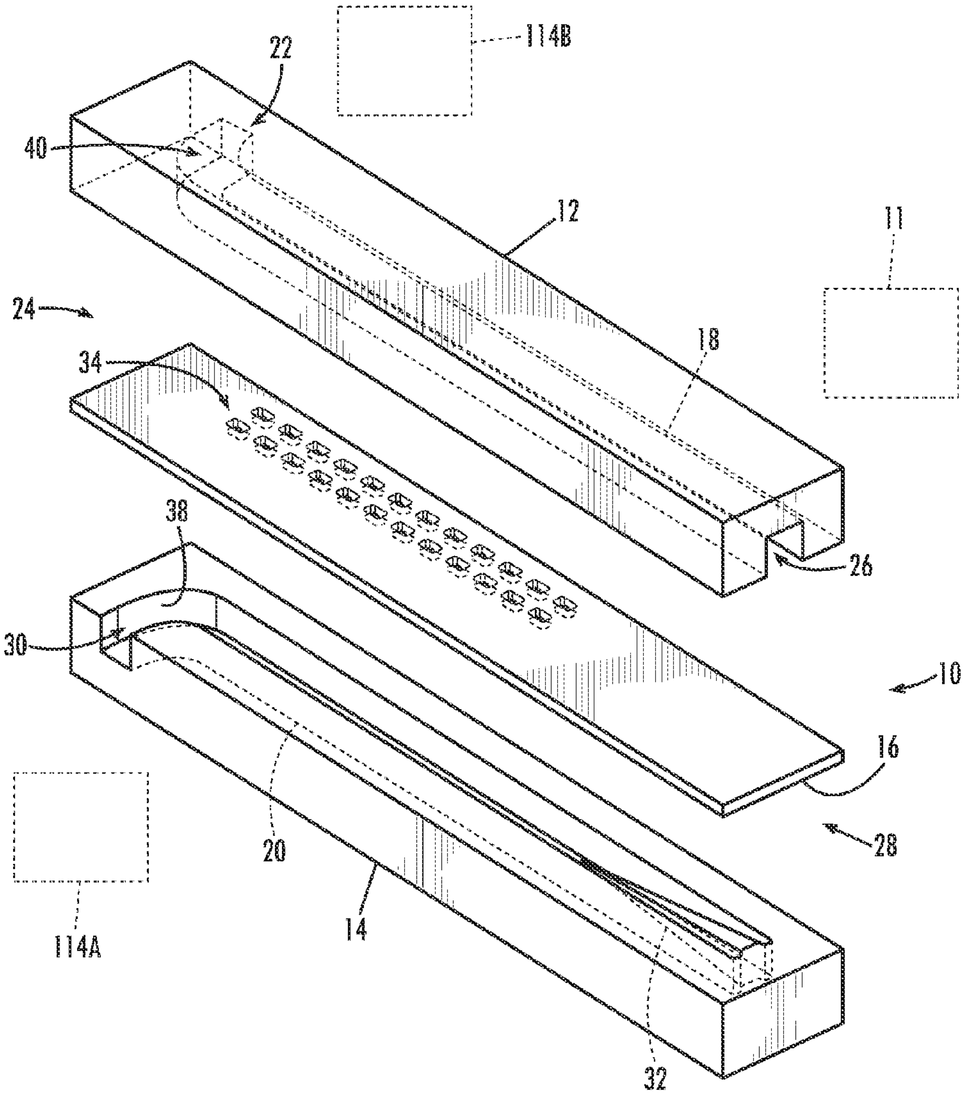
FIG. 3B is an exploded view of the coupler as shown in FIG. 3, with hidden lines shown in phantom.

The components of wireless system 100 shown in FIG. 1E are similar to those in the embodiment described with regard to FIG. 1A, and to that extent, the description of the components is therefore not repeated. The operation of the system components is the same as described above with regard to FIG. 1A, except that router 114 directs packets to, and receives packets from, both transceivers 127 and 129 through a single indoor unit 123. Similarly, router 116 directs packets to, and receives packets from, both transceivers 128 and 130 through a single indoor unit 126. Transceiver 127 transmits (or receives) at a given frequency, as does transceiver 128. Both transceivers 127 and 128 provide and receive signals to and from the first and second couplers 10, respectively, in the same polarization, so that transceivers 127 and 128 communicate with each other, as described above. Transceivers 129 and 130 communicate with each other in any of the arrangements described above with regard to FIGS. 1A-1C, i.e. as a co-channel dual-polarized application, an adjacent channel dual-polarized application, or an adjacent channel co-polarized application. This arrangement may be referred to as a 2+0 bonded channel application.

It should be understood that the two radio systems may vary with respect to each other and may, for example, use different dual-mode couplers between the respective transceivers and antennas. As should be understood, radio units may be transmit-only or receive-only radios, or may be dual purpose transceiver radios, depending on the needs of the system. Thus, while the presently described examples refer to transceiver radios, it should be understood that the radio systems could use transmit-only radios or receive-only radios. Moreover, although line-of-sight communication systems are described above with respect to FIGS. 1A-1E, this is for purposes of example only, and it should be understood that couplers and radios as described herein may be used in various other types of communication systems, for instance radar or satellite communication systems, in which it may be desirable to change polarization of signals to or from a given radio.

Referring to FIGS. 2, 3A, 3B and 4A-4C, a microwave coupler 10 has a first elongated waveguide section 12, a second elongated waveguide section 14 and a center wall 16 that is common to both waveguides. First waveguide section 12 defines a first microwave transmission line 18 that is square in cross section in a plane perpendicular to the plane of center wall 16. Second waveguide section 14 defines a second microwave transmission line 20 that is also square in cross-section with respect to the same perpendicular plane. While square waveguides are used in the presently-described embodiments, it should be understood that other waveguide configurations fall within the scope of the present disclosure. For example, while rectangular waveguides typically form single mode transmission lines, they can propagate dual modes if the signal frequency is sufficiently high and/or the dimensions are properly selected, as should be understood by those skilled in the art. Circular and elliptical waveguide transmission lines may also be used, and in such embodiments the intermediate plate defining the slots conform to the circular or elliptical shape of the transmission lines.

First waveguide section 12, second waveguide section 14 and center wall 16 are secured together by, for example, bolts (not shown) or other suitable means such as brazing. The waveguide sections have generally rectangular outer dimensions, although such dimensions may vary as desired, and are preferably made of metal such as aluminum or a non-metal material, such as a polymer with a highly electrically conductive coating such as silver or copper. It should be understood that the waveguide sections may be made of any material as desired, provided that surfaces in contact with electromagnetic waves are highly electrically conductive.

Dual mode waveguide transmission line 18 extends from a first radio port 22 at a first end 24 of coupler 10 to an antenna port 26 at the coupler body's opposite end 28. In second waveguide section 14, second dual mode transmission line 20 extends from a second radio port 30 to a microwave absorbing element 32 at second coupler body end 28.

In describing microwave transmission lines 18 and 20 as dual-mode, it should be understood that the present disclosure refers to transmission lines over which microwave signals having modes with orthogonal polarization may propagate simultaneously in electrical isolation. As should be understood, microwave transmission lines are usually constructed to propagate a single mode only. The dimensions of such a transmission line are in a specific range compared to the free space wavelength of the transmitted radiation. At high frequencies, however, the waveguide transmission line dimensions may be sufficiently large such that higher modes, which can have orthogonal polarizations, can travel along the same line and, in such instance, could be considered dual mode. Thus, a dual mode transmission line refers to a transmission line with dimensions that operably support two propagating modes that have orthogonal polarizations. It should also be understood that evanescent modes are not considered in determining whether a transmission line is a dual mode line, since such modes decay quickly as a function of distance along the direction of propagation.

The long, straight central portions of transmission lines 18 and 20 open toward, and are aligned in parallel with, each other. They are separated by center wall 16 and, more particularly, a dual row of slots 34 defined in and through the center wall. Wall 16 is preferably a thin metal plate. The plate's thickness may be determined on a case-by-case basis with regard to manufacturability and performance. As should be understood, greater thickness in the common wall of a coupler tends to degrade coupling uniformity but improve isolation and return loss, while very thin walls can be difficult to manufacture. The construction and dimensions of the common wall of the coupler are not peculiar to a dual-mode coupler, as compared to a single-mode coupler, and are therefore not discussed further herein.

Figure 4A:
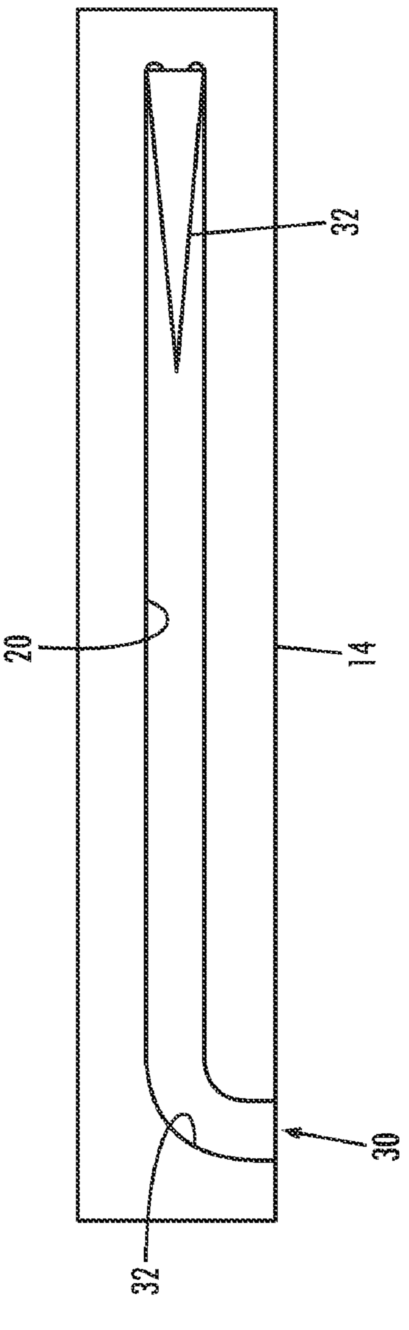
FIG. 4A is a top view of a bottom waveguide section of the coupler shown in FIG. 2.
Figure 4B:
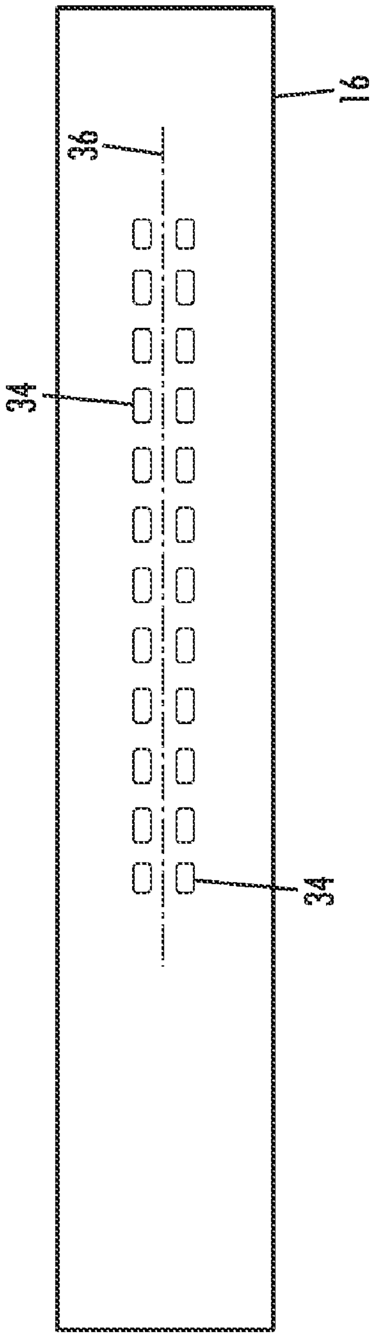
FIG. 4B is a top view of a center wall section of the coupler shown in FIG. 2.
Figure 4C:
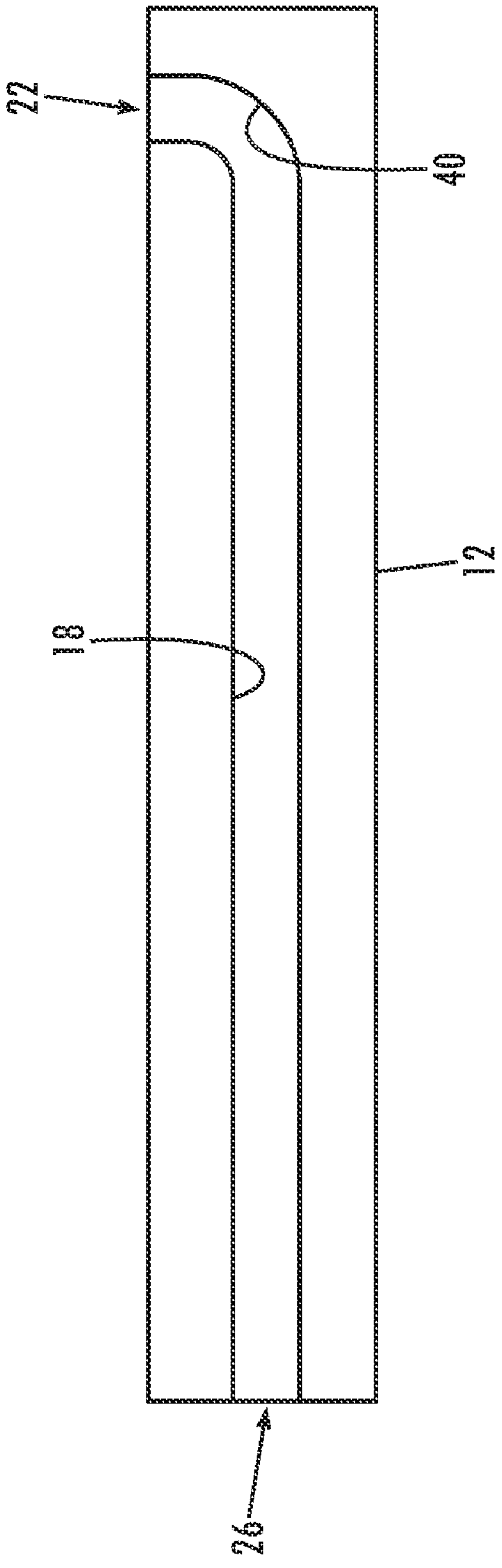
FIG. 4C is a bottom view of a top waveguide section of the coupler shown in FIG. 2.
Figure 5A:
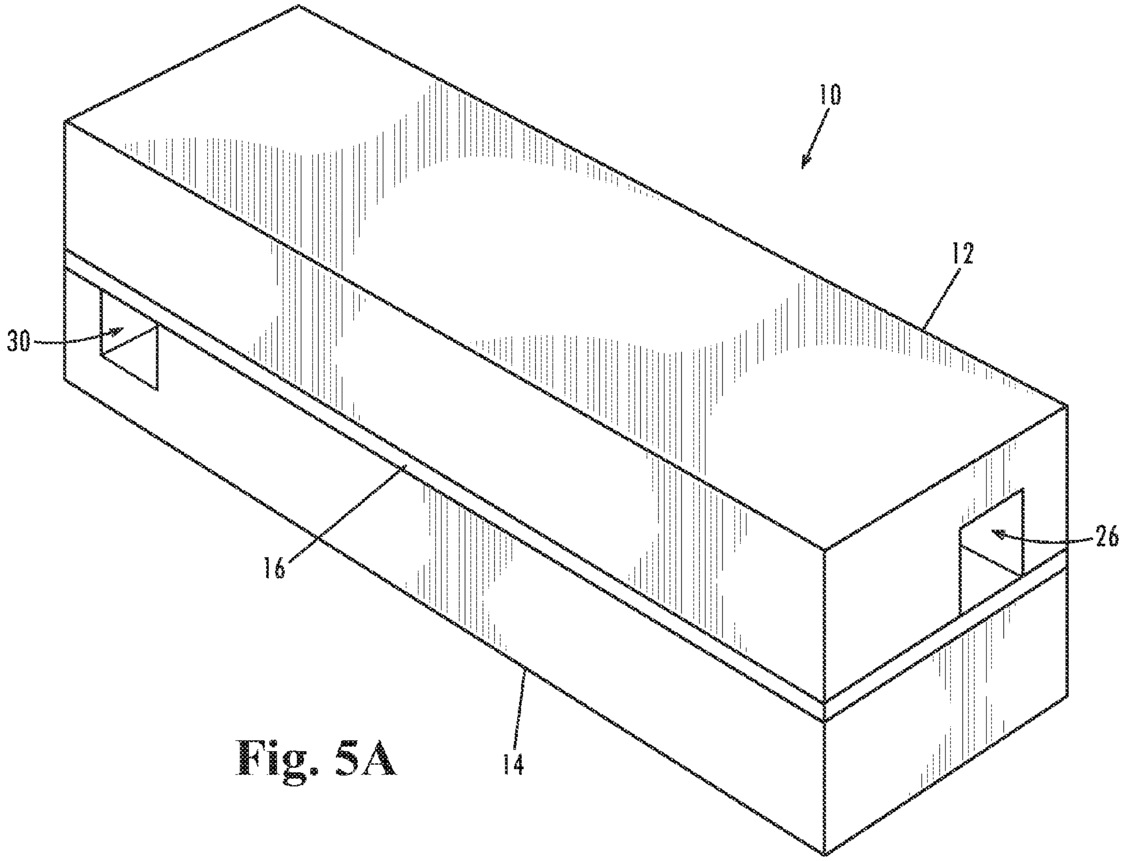
FIG. 5A is a perspective view of a microwave coupler in accordance with one embodiment of the present invention.
Figure 5B:
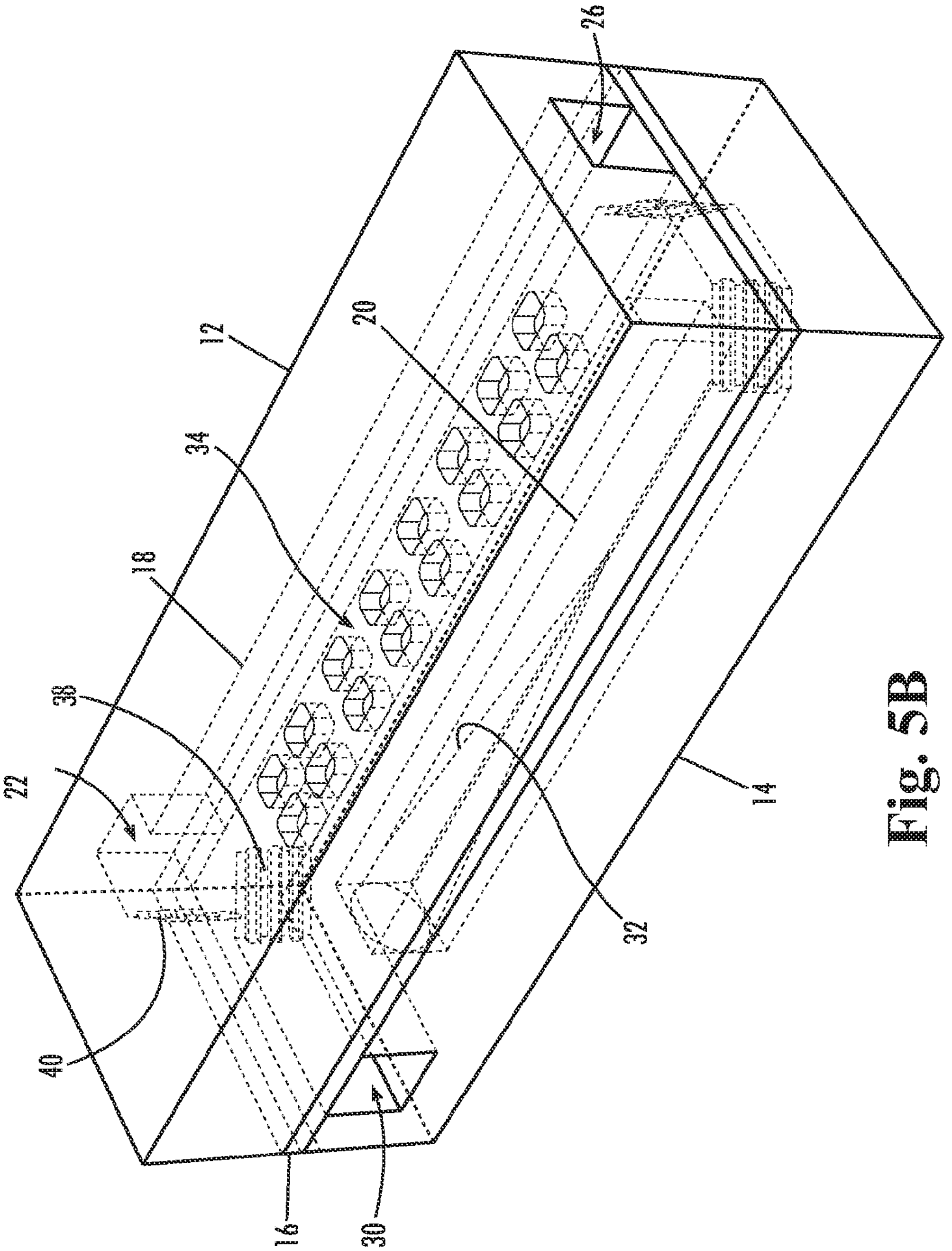
FIG. 5B is a perspective view of the coupler as in FIG. 5A, with hidden lines shown in phantom.

Referring also to FIG. 4B, the two rows of slots 34 are symmetric with respect to a centerline 36 that is aligned with the direction of propagation. A plane (not shown) perpendicular to the plane of center wall 16 and including centerline 36 bisects the elongated portion of each of waveguide transmission lines 18 and 20. The distance between sequential slots in each row is approximately equal to a quarter wavelength of the electromagnetic wave supported by the coupler. The distance between the rows relates primarily to the desired coupling value, and will vary with the coupling value for which the coupler is designed. As should be understood in view of the present disclosure, the distance between rows can be determined through simulation and modeling to achieve the desired coupling value. In general, the coupler's dimensions will depend on frequency and bandwidth of the signals with which the coupler is intended to operate, the coupler's required performance (e.g. coupling value), and the thickness of the coupler's common wall, and given these parameters, suitable dimensions for a coupler can be determined by modeling.

Each of the two coupling waveguides has two propagating modes, the polarizations of which are orthogonal to each other. Considering the distribution of electrical and magnetic fields of each mode, it can be shown that the symmetry of the coupling apertures/slots with respect to one of the common wall centerlines (the one parallel to the length of the waveguides in the coupling section) causes the isolation between the two modes. In other words, theoretically, changes in energy of one mode has no, or in practice very small, effect on that of the other mode.

Although the presently-described embodiment uses rectangular slots that are aligned longitudinally in the direction of propagation, it should be understood that slots of other shapes may be employed. In this one preferred embodiment, however, there are two rows of such slots that are symmetrical with respect to the plane perpendicular to plate 16 and including centerline 36, such that each pair of opposing slots across the two rows are also symmetric, about a plane perpendicular to plate 16 and perpendicular to centerline 36, with respect to each adjacent pair of such slots.

Between port 30 and the main, elongated central portion of waveguide transmission line 20, and between port 22 and the elongated central portion of waveguide transmission line 18, transmission lines 20 and 18 define respective curved portions 38 and 40. The curved portions permit ports 22 and 30 to be located on opposite lateral sides of coupler 10 that extend between and generally transverse to ends 24 and 28. This allows microwave transceivers 127 and 129 to be disposed on the sides, rather than behind, the coupler, thereby achieving a more compact system structure. Although shown in phantom for purposes of clarity, it will be understood that transceiver 127 is coupled to port 30, and transceiver 129 is coupled to port 22, and antenna 11 is coupled to port 26, by suitable adapters, as discussed in more detail below. It has been known in the prior art to have bends in waveguide transmission lines using mitered corners. In dual-mode waveguides, such mitered corners have been constructed using multiple surface reflectors implemented as ridged surfaces or a plurality of parallel wires. As shown in the present figures, however, corners 38 and 40 are formed as smooth, continuous curved sections having a radius tuned to provide desirable performance. The smooth surface corners cause the device to have different return losses for the two modes. By tuning the corner radius, however, the waveguide transmission line may preferably be optimized to the lowest return loss over the bandwidth range of the propagating energy. Such optimum radius is typically less than the width of the square waveguide section, but this is not required. A radius as large as possible may be preferred, but results in a less compact device.

Microwave termination 32 is of a conical shape and is made of electromagnetic wave-absorbing material, for example ECCOSORB MF-117, available from Emerson & Cuming Microwave Products, Inc. of Randolph, Mass. The microwave termination may, however, comprise different material and shapes for the same purpose, as should be understood by those skilled in the art. For example, the microwave termination may comprise a stepped taper or a pyramid taper, preferably symmetric with respect to orthogonal planes that are, respectively, parallel and perpendicular to plate 16 and that include the centerline of the waveguide in which the microwave termination is placed.

In another embodiment, microwave transmission line 20 includes a second curved section (similar to curved section 38) just before microwave-absorbing termination 32. The second curved section continues to a 180 degree turn so that microwave termination 32 lies parallel to the elongated section of microwave transmission line 20. This may reduce the length of the coupler, whether or not the overall length of microwave transmission line 20 is reduced, and microwave transmission line 18 is shortened accordingly. This increases the width of coupler 10 but may decrease its length.

Such an embodiment is illustrated in FIGS. 5A, 5B, 6A, 6B and 7A-7C. A microwave coupler 10 has a first elongated waveguide section 12, a second elongated waveguide section 14 and a center wall 16 that is common to both waveguides. First waveguide section 12 defines a first microwave transmission line 18 that is square in cross-section in a plane perpendicular to the plane of center wall 16. Second waveguide section 14 defines a second microwave transmission line 20 that is also square in cross-section with respect to the same perpendicular plane. First waveguide section 12, second waveguide section 14 and center wall 16 are secured together by, for example, bolts (not shown) or other suitable means such as brazing. The waveguide sections are preferably made of metal such as aluminum or a non-metal material, such a polymer with a highly electrically conductive coating such as silver or copper. It should be understood that the waveguide sections may be made of any material as desired, provided that surfaces in contact with electromagnetic waves are highly electrically conductive.

Figure 6A:
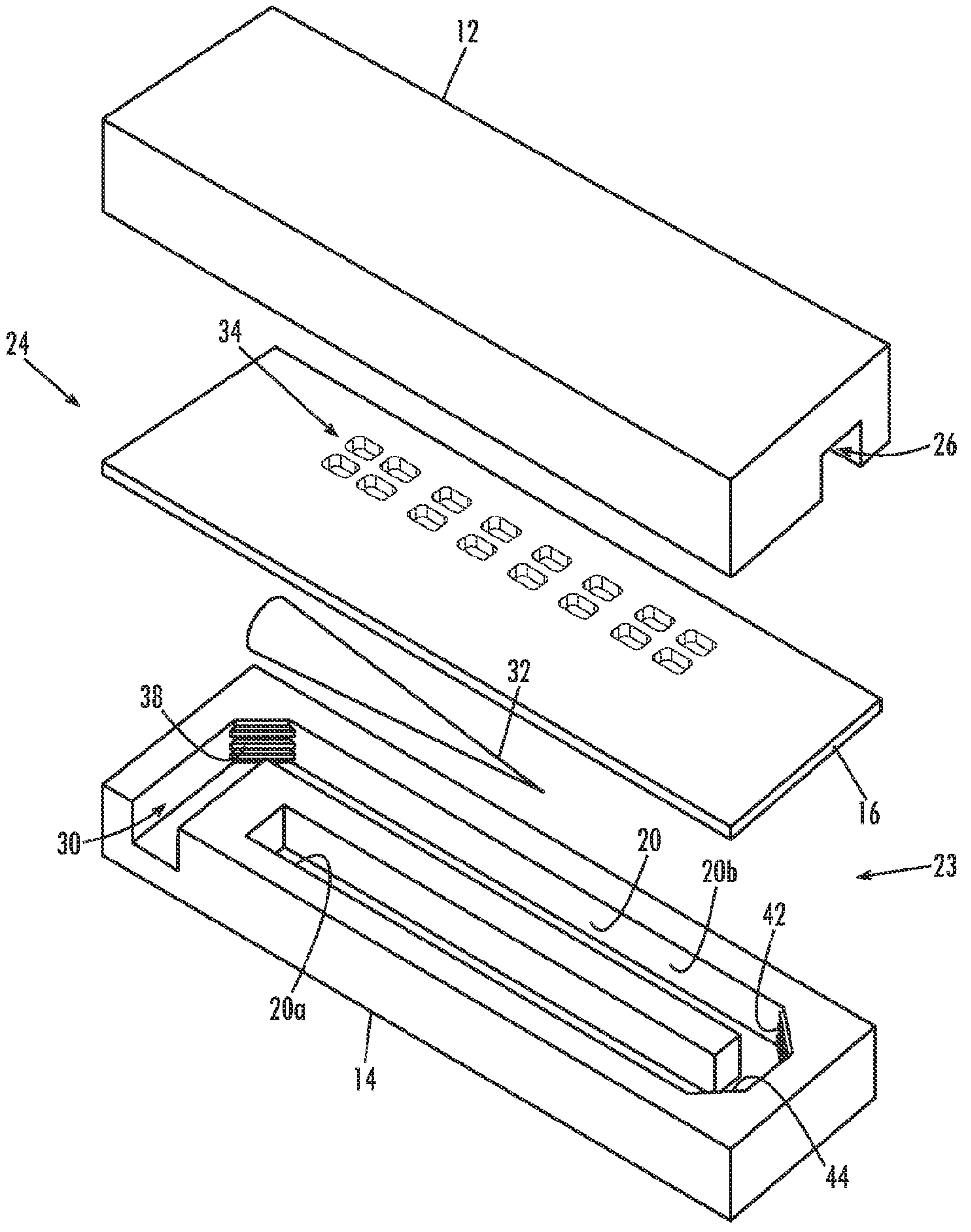
FIG. 6A is an exploded view of the coupler shown in FIG. 5A.
Figure 6B:
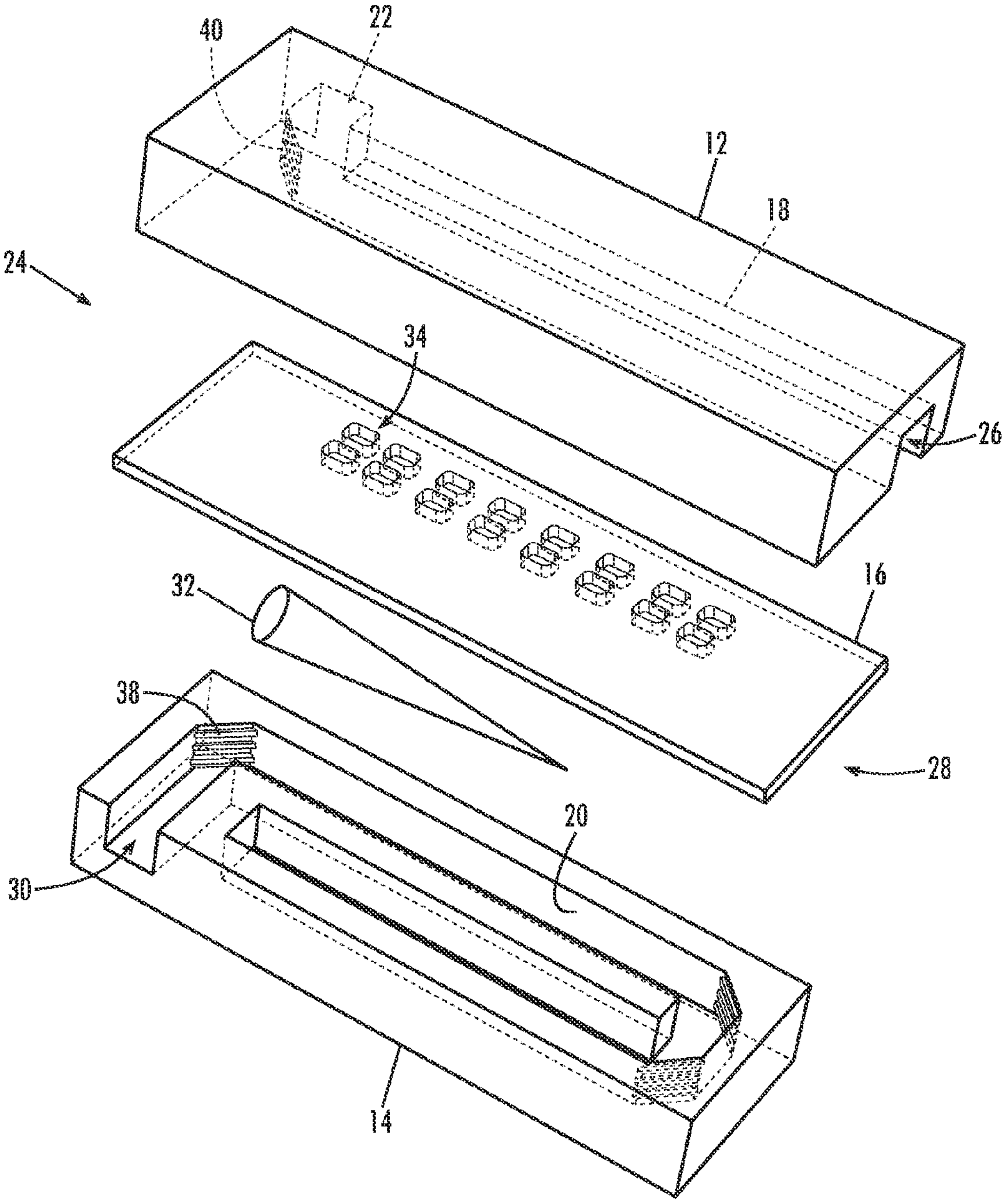
FIG. 6B is an exploded view of the coupler shown in FIG. 6A, with hidden lines shown in phantom.
Figure 7A:
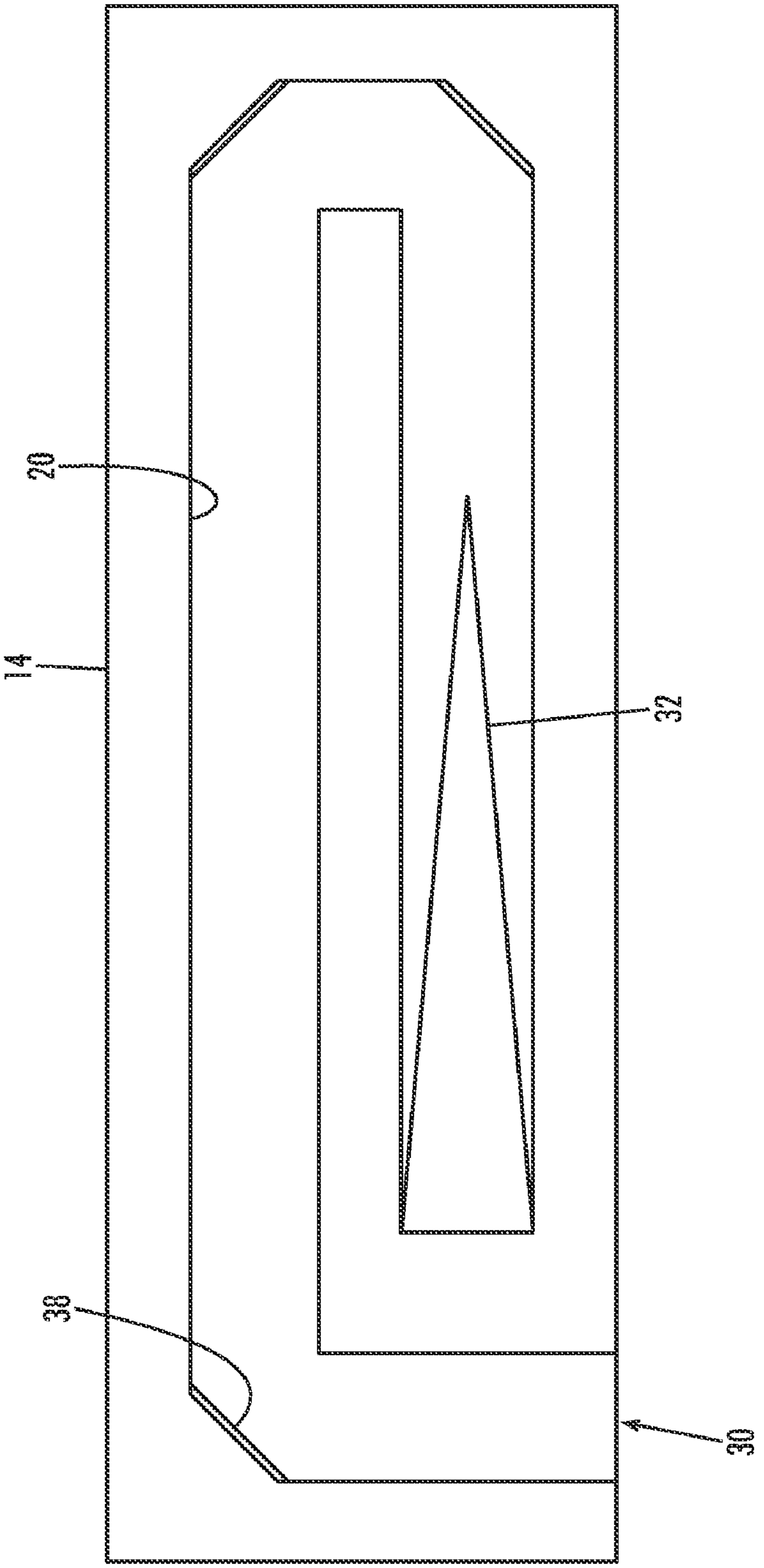
FIG. 7A is a top view of a bottom waveguide section of the coupler shown in FIG. 5A.
Figure 7B:
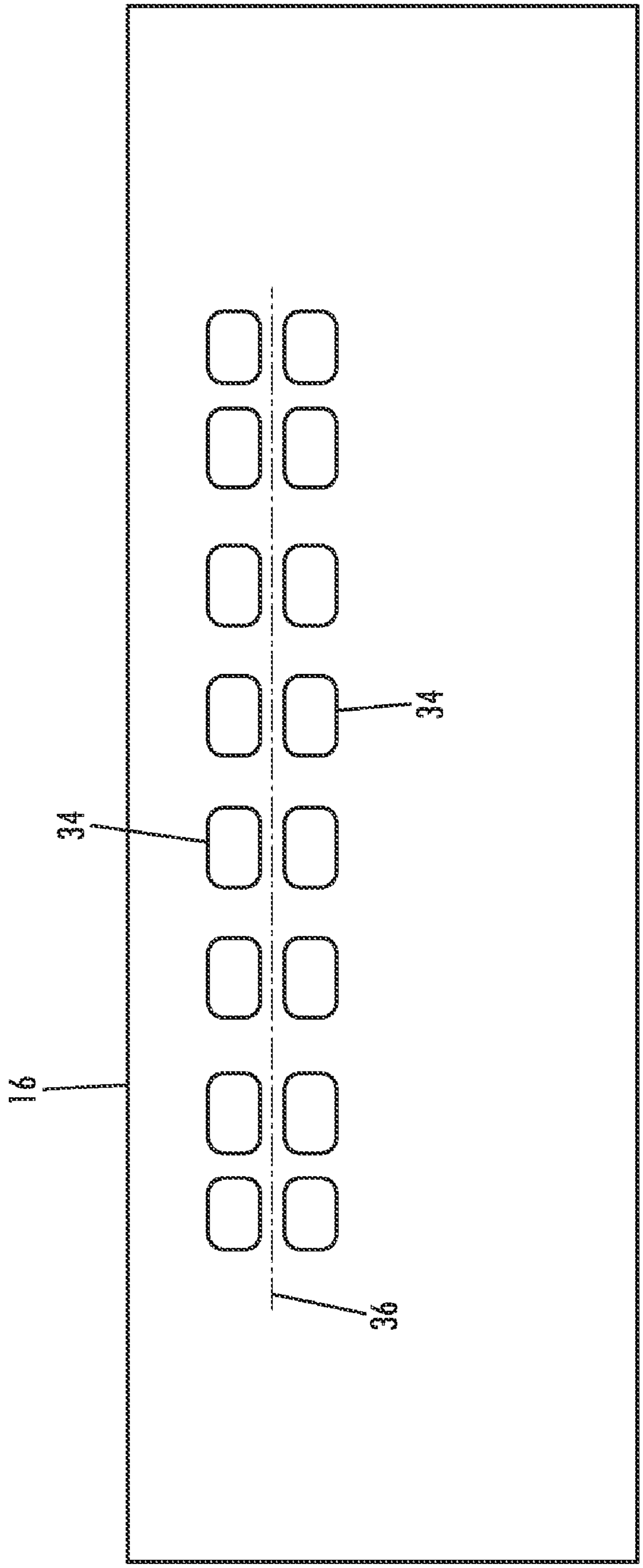
FIG. 7B is a top view of a center wall section of the coupler shown in FIG. 5A.
Figure 7C:
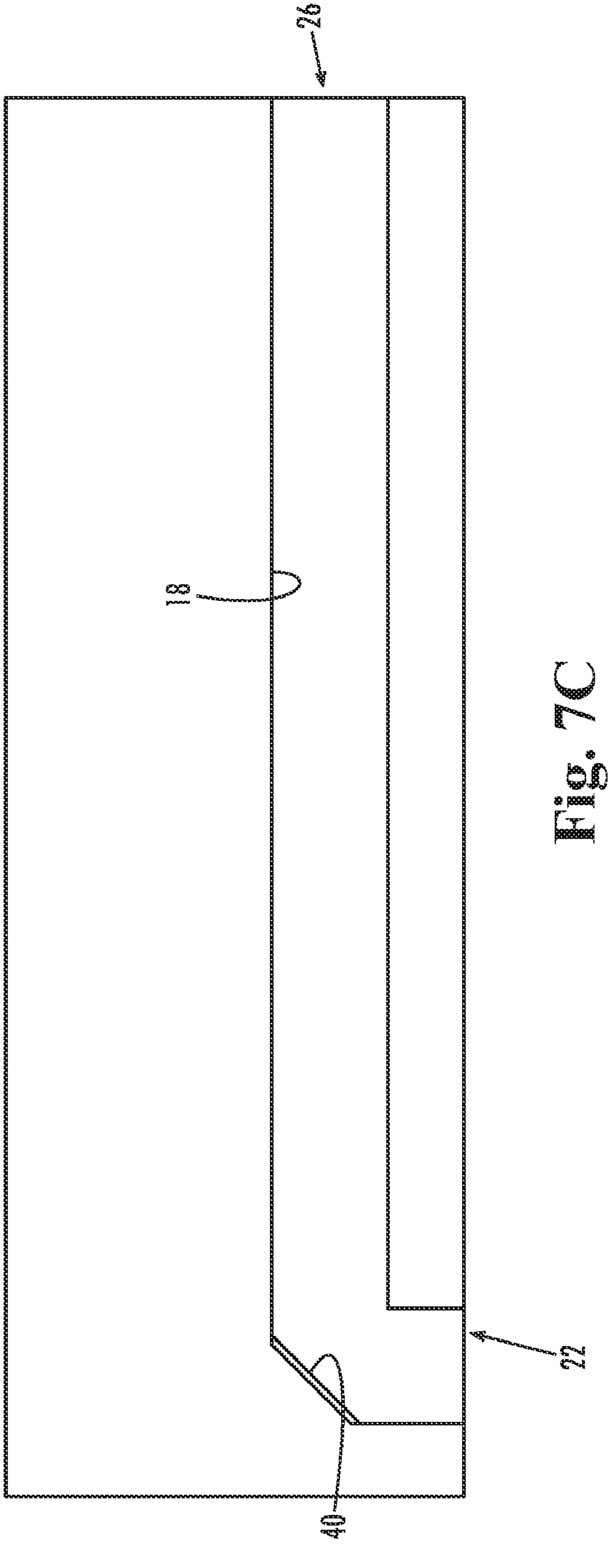
FIG. 7C is a bottom view of a top waveguide section of the coupler shown in FIG. 5A.

Dual mode waveguide transmission line 18 extends from a first radio port 22 at a first end 24 of coupler 10 to an antenna port 26 at the coupler body's opposite end 28. In second waveguide section 14, second dual mode transmission line 20 extends from a second radio port 30 to a microwave absorbing element 32. Unlike the embodiment shown in FIGS. 2-4C, however, transmission line 20 includes two additional bends, at 42 and 44, so that an end portion 20A of microwave transmission line 20 opposite port 30 that receives microwave absorbing element 32 extends through the central portion of section 14, parallel to main portion 20B of transmission line 20 that opposes the elongated portion of transmission line 18 across slots 34. In the presently described embodiment, this shortens the length of bottom section 14, and therefore top section 12 and transmission line 18, although increasing the coupler's width. The increase in width is evident from examination of center wall 16. Referring specifically to FIG. 7B, for instance, the top row of slots 34 are disposed at the same distance from the center wall's top edge as is shown in FIG. 4B, but there is an increased distance between the bottom row of slots and the center wall's bottom edge, attributable to the double-back of transmission line 20, as shown in FIG. 6A.

In the embodiment shown in FIGS. 5A-7C, transmission line bends 38, 40, 42 and 44 are illustrated as mitered ridged surfaces, rather than the smooth curved surfaces shown in the embodiment of FIGS. 2-4C. It should be understood that this is for purposes of example only. The bends in either embodiment may be formed by any suitable configuration. For example, curved surfaces similar to those shown in the embodiment of FIGS. 2-4C may be used in place of the ridged surfaces in the embodiment of FIGS. 5A-7C.

It should be understood that the particular dimensions of the waveguide transmission lines may be determined as desired for a given configuration. For example, by methods such as experiment or electromagnetic simulation, the size, shape and distance between slots 34 can be determined to provide required or desired coupling values, isolation between radio ports, isolation between orthogonal propagating modes and polarizations, and impedance matching. Similar methods may also be employed to design the dual mode waveguide corners and the microwave termination. Further, it is possible to design the coupling section so that the coupling value for the two propagating modes in the waveguide, and therefore the microwave coupler, are different. Such configuration can provide high isolation between the two modes and, therefore, polarizations. Although it will therefore be understood that the dimensions and configurations of the coupler may vary, in one preferred embodiment the length of each side of each of the two dual polarization waveguide transmission lines 18 and 20 (if filled with air) is about sixty percent of the free space wavelength of the propagating energy. The center-to-center distance (in the direction of wave propagation) between two adjacent coupling apertures 34 is approximately one quarter of the propagating energy in the dual mode waveguide transmission lines. As noted above, the optimum radius for the dual mode corners is typically less than the size of the pertaining square waveguide.

Microwave coupler 10 maybe fabricated, for example, by CNC milling Middle plate 16, if of sufficiently small thickness, can be fabricated by etching. As should be understood, precision in manufacturing may be desirable to meet electrical specifications where tight tolerances are required.

In operation, transceiver 129 is coupled to port 22 so that transceiver 129 outputs microwave signals into dual polarization transmission line 18. Antenna 11 is coupled to port 26 so that this signal excites the antenna, which thereby radiates microwave radiation 108 (FIG. 1) to the other radio system 104. The polarization of the electromagnetic waves in free space depends on the coupler's orientation with respect to the radiating antenna to which it is attached, any polarization rotators (e.g. waveguide twists) between the coupler and the transmitting radio or between the coupler and the antenna, and the configuration of the transmitting antenna. In the example described herein, these system components are configured so that a given polarization (e.g. horizontal or vertical) of waves propagating in the coupler corresponds to the same polarization of electromagnetic radiation in free space, but this is for purposes of explanation only, and it should be understood that the system may be configured so that the polarizations differ. Radiation 108 received by antenna 11 from antenna 13 causes antenna 11 to output corresponding microwave signals into transmission line 18, which is then received by transceiver 129 via port 22.

In the event transceiver 129 fails or is otherwise disabled or disconnected, (assuming a configuration as described above with regard to FIG. 1D) transceiver 127, which is coupled to port 30, outputs microwave signals into transmission line 20. The direct electromagnetic waves are absorbed by microwave absorbing element 32, but the electromagnetic waves in the main elongated portion of transmission line 20 excite slots 34, thereby exciting corresponding electromagnetic waves in transmission line 18 and causing antenna 11 to radiate microwave radiation 108. Conversely, radiation 108 received by microwave antenna 11 causes corresponding electromagnetic waves in transmission line 18, thereby exciting slots 34 and causing corresponding electromagnetic waves in transmission line 20 that are, in turn, received by transceiver 128A.

More specifically, as described above with regard to FIGS. 1A-1E, dual mode couplers 10 may receive microwave signals from transceivers 127/129 or 128/130 that propagate in the same or orthogonal polarizations. In the latter instance, for example, assume transceiver 127 inputs microwave signals to transmission line 20 so that transmission line 20 propagates horizontally polarized (in the perspective shown in FIG. 3B) electromagnetic waves in a $TE_{01}$ mode. As should be understood, the description of a $TE_{01}$ mode wave in the transmission line as "horizontally" polarized depends on the wave's, and therefore the coupler's, orientation with respect to ground. The present discussion assumes the coupler's top and bottom walls are horizontal, or parallel to an ideal ground plane. It should be understood, however, that this assumed orientation is provided for purposes of example only and to facilitate the discussion below, and that couplers as described herein may be used in various physical orientations.

The waves excite slots 34, which in turn excite horizontally and vertically polarized waves in transmission line 18. Because the two rows of slots 34 are symmetric with respect to centerline 36 (FIG. 4B) of transmission lines 18 and 20, however, the vertically polarized energy in transmission line 18 excited by the one of the rows is 180° out of phase with respect to the vertically polarized energy in transmission line 18 excited by the other row. Thus, the vertically-polarized energy cancels. In contrast, the horizontally-polarized energy excited by the two rows is in phase and adds, thereby leaving a horizontally-polarized $TE_{01}$ mode wave in transmission line 18. Assume also that transceiver 129 inputs microwave signals to transmission line 18 so that transmission line 18 propagates vertically-polarized (in the perspective shown in FIG. 3B) electromagnetic waves in a $TE_{10}$ mode. This wave also excites slots 34, which in turn excite horizontally and vertically-polarized waves in transmission line 20. Again because the two rows of slots 34 are symmetric with respect to centerline 36, the horizontally-polarized energy in transmission line 20 excited by one of the rows is 180° out of phase with respect to the horizontally-polarized energy in transmission line 20 excited by the other row, whereas the vertically-polarized energy excited by the two rows is in phase and adds, thereby leaving a vertically-polarized $TE_{10}$ mode in transmission line 20. As a result, both transmission lines 18 and 20 support the horizontally-polarized $TE_{01}$ signal from transceiver 127 and the vertically-polarized $TE_{10}$ signal from transceiver 129, electrically isolated from each other, and both signals drive antenna 11 to radiate radiation 108. Of course, transceiver 127 could input a vertically-polarized signal to transmission line 20, and transceiver 129 a horizontally-polarized signal to transmission line 18, and in this instance the vertically-polarized signal from transceiver 127 on transmission line 20 excites a vertically-polarized signal on line 18, and the horizontally-polarized signal on line 20 excites a horizontally-polarized signal on line 18, both driving antenna 11. Still further, both transceivers 127 and 129 may input signals to transmission lines 20 and 18 at the same polarization but at different frequencies. The other dual mode coupler 10 operates in the same manner when driven by transceivers 128 and 130.

In the receiving function, assume antenna 11 receives signals from antenna 13 carrying both vertically-polarized and horizontally-polarized energy. The antenna inputs signals to transmission line 18 that, in turn, propagates both vertically and horizontally-polarized waves. As discussed above, this excites both vertically and horizontally-polarized waves in transmission line 20. Assume transceiver 127 is coupled to coupler 10 at port 30 to provide vertically-polarized signals to, and receive vertically-polarized signals from, the coupler and that transceiver 129 is coupled to coupler 10 at port 22 to provide horizontally-polarized signals to, and receive horizontally-polarized signals from, the coupler. Transceiver 127 thereby receives the vertically-polarized signal, and transceiver 129 receives the horizontally-polarized signal. Assume also that the vertically-polarized signals arise from vertically-polarized signals input to the other coupler 10 by transceiver 128 and that the horizontally-polarized signals arise from horizontally-polarized radiation in radiation 108 driven by horizontally-polarized signals input to the other coupler 10 by transceiver 130. In this manner, transceivers 128 and 127 communicate with each other, and transceivers 130 and 129 communicate with each other. Antenna 13 and system 104 may receive signals from antenna 11 and system 102 in the same manner As noted herein, however, these examples are provided by way of explanation only, and the present disclosure encompasses other dual-mode coupler configurations and communications arrangements.

In order to change the polarization of signals from one of the radio/transceiver units 127 and/or 129, the respective radio(s) may be rotated by 90° or, as should be understood, by adding a 90° waveguide twist between the radio unit and the microwave coupler. If the radio unit is capable of inherently transmitting in dual polarizations, such mechanical adjustments need not be made.

Depending on the type of antenna and, in the case of a reflector antenna, its feeding structure, the two different and substantially orthogonal polarizations may be linear (for example, horizontal and vertical) or circular (i.e., right hand circular and left hand circular).

Adaptors (not shown) are used to mount the radio units and the antenna to the dual mode coupler. For example, radio units used in line-of-sight radio links usually have rectangular waveguide ports, whereas reflector-type antennas usually have circular-type waveguide ports. Thus, if dual mode microwave coupler 10 has square waveguide ports, in one embodiment rectangular-to-square waveguide adaptors may be used to couple the radios to the ports, and a circular-to-square waveguide adaptor may be used to mate the antenna port to the square coupler port. To facilitate the rotation of a radio, to thereby rotate polarization, each radio may be coupled to the coupler by a rectangular-to-circular adapter (with the rectangular connection connected to the radio's rectangular port) connected to a circular-to-square adapter (with the square connection at the coupler's square port). The circular-to-circular connection at the adapters facilitates relative rotation between the radio and the coupler. The principal criteria for designing couplers is good impedance matching, i.e., sufficiently low reflection of electromagnetic signals due to mismatch between the transmission lines, and also isolation between the dual modes expected to be transmitted and/or received. The design of waveguide port adaptors should be understood by those skilled in the art and is, therefore, not further discussed herein.

Mechanical provisions such as extension of metal blocks and brackets, may be added to secure the coupler to the radio units and the antenna.

While one or more preferred embodiments of the invention have been described, it should be understood that any and all equivalent realizations of the present invention are included within the scope and spirit thereof. For example, while the above-described microwave transmission lines are filled with air, it should be understood that the transmission lines may be loaded with a dielectric material having a dielectric constant higher than that of air, to thereby reduce coupler size, although at the cost of reducing maximum bandwidth. Thus, it should be understood that the embodiments described are presented by way of example only and are not intended as limitations upon the present invention. It should be understood by those of ordinary skill in this art that the present disclosure is not limited to these embodiments since modifications can be made. Therefore, it is contemplated that any and all such embodiments are included within the scope of the present disclosure.

What is claimed is:

1. A communication system, comprising:

a first radio system, comprising a first microwave radio, a second microwave radio, a first antenna, and a first dual mode coupler comprising a first dual mode transmission line extending between a first port and a third port and a second dual mode transmission line extending between a second port and a microwave absorbing termination, wherein the first microwave radio is coupled to the first port so that the first microwave radio is operable to at least one of outputting microwave signals into and receiving microwave signals from the first dual mode transmission line by the first port, wherein the second microwave radio is coupled to the second port so that the second microwave radio is operable to at least one of outputting microwave signals into and receiving microwave signals from the second transmission line by the second port, wherein the first antenna is coupled to the third port so that the first antenna is operable to at least one of outputting microwave signals into and receiving microwave signals from the first dual mode transmission line by the third port, and wherein the first dual mode transmission line is coupled to the second dual mode transmission line so that microwave signals in either of the first dual mode transmission line and the second dual mode transmission line propagate microwave signals in the other of the first dual mode transmission line and the second dual mode transmission line; and a second radio system, comprising a third microwave radio, and a second antenna coupled to the third microwave radio, wherein the first radio system and the second radio system are disposed in a geographic area so that one of the first antenna and the second antenna radiates microwave radiation to the other of the first antenna and the second antenna.

2. The communication system as in claim 1, wherein the second radio system comprises:

the third microwave radio, a fourth microwave radio, the second antenna, and a second dual mode coupler comprising a third dual mode transmission line extending between a fourth port and a sixth port and a fourth dual mode transmission line extending between a fifth port and a microwave absorbing termination, wherein the third microwave radio is coupled to the fourth port so that the third microwave radio is operable to at least one of outputting microwave signals into and receiving microwave signals from the third dual mode transmission line by the fourth port, wherein the fourth microwave radio is coupled to the fifth port so that the fourth microwave radio is operable to at least one of outputting microwave signals into and receiving microwave signals from the fourth dual mode transmission line by the fifth port, wherein the second antenna is coupled to the sixth port so that the second antenna is operable to at least one of outputting microwave signals into and receiving microwave signals from the third dual mode transmission line by the sixth port, and wherein the third dual mode transmission line is coupled to the fourth dual mode transmission line so that microwave signals in either of the third dual mode transmission line and the fourth dual mode transmission line propagate microwave signals in the other of the third dual mode transmission line and the fourth dual mode transmission line.

3. The communication system as in claim 2, wherein each of the first microwave radio, the second microwave radio, the third microwave radio, and the fourth microwave radio is a transceiver that outputs microwave signals modulated to carry information and receives microwave signals modulated to carry information.

4. The communication system as in claim 3, wherein the first microwave radio and one of the third microwave radio and the fourth microwave radio communicate with each other, and output microwave signals to and receive microwave signals from the first dual mode coupler and the second dual mode coupler, respectively, at a first frequency and a first polarization, and the second microwave radio and the other of the third microwave radio and the fourth microwave radio communicate with each other, and output microwave signals to and receive microwave signals from the first dual mode coupler and the second dual mode coupler, respectively, at a second frequency and a second polarization.

5. The communication system as in claim 4, wherein the first frequency and the second frequency are the same, and wherein the first polarization and the second polarization are orthogonal to each other.

6. The communication system as in claim 5, wherein the first microwave radio communicates with the one of the third microwave radio and the fourth microwave radio at the same time the second microwave radio communicates with the other of the third microwave radio and the fourth microwave radio.

7. The communication system as in claim 4, wherein the first frequency and the second frequency are different, and wherein the first polarization and the second polarization are orthogonal to each other.

8. The communication system as in claim 7, wherein the first microwave radio communicates with the one of the third microwave radio and the fourth microwave radio at the same time the second microwave radio communicates with the other of the third microwave radio and the fourth microwave radio.

9. The communication system as in claim 4, wherein the first frequency and the second frequency are different, and wherein the first polarization and the second polarization are the same.

10. The communication system as in claim 9, wherein the first microwave radio communicates with the one of the third microwave radio and the fourth microwave radio at the same time the second microwave radio communicates with the other of the third microwave radio and the fourth microwave radio.

11. The communication system as in claim 4, wherein the first microwave radio communicates with the one of the third microwave radio and the fourth microwave radio when the second microwave radio is not communicating with the other of the third microwave radio and the fourth microwave radio, and wherein the second microwave radio communicates with the one of the third microwave radio and the fourth microwave radio when the first microwave radio is not communicating with the one of the third microwave radio and the fourth microwave radio.

12. The communication system as in claim 11, wherein the first frequency and the second frequency are the same, and wherein the first polarization and the second polarization are the same.

13. The communication system as in claim 1, wherein each of the first microwave radio, the second microwave radio and the third microwave radio is a transceiver that outputs microwave signals modulated to carry information and receives microwave signals modulated to carry information.

14. A radio and antenna system, comprising a first microwave radio;

a second microwave radio;

an antenna; and a dual mode coupler comprising a first end, a second end opposite the first end, a first side extending between and generally transverse to the first end and the second end, a second side opposite the first side and extending between and generally transverse to the first end and the second end, a first port, a second port, a third port, a first dual mode transmission line extending between the first port and the third port, and a second dual mode transmission line extending between the second port and a microwave absorbing termination, wherein the first port is defined in the first side, wherein the third port is defined in the second end, wherein the second port is defined in the second side, wherein the first microwave radio is coupled to the first port so that the first microwave radio is operable to at least one of outputting microwave signals into and receiving microwave signals from the first dual mode transmission line by the first port, wherein the antenna is coupled to the third port so that the antenna is operable to at least one of outputting microwave signals into and receiving microwave signals from the first dual mode transmission line by the third port, wherein the second microwave radio is coupled to the second port so that the second microwave radio is operable to at least one of outputting microwave signals into and receiving microwave signals from the second dual mode transmission line by the second port, and wherein the first dual mode transmission line is coupled to the second dual mode transmission line so that microwave signals in either of the first dual mode transmission line and the second dual mode transmission line propagate microwave signals in the other of the first dual mode transmission line and the second dual mode transmission line.

15. The system as in claim 14, wherein the first dual mode transmission line has a first bend between the first port and the third port, wherein the second dual mode transmission line has a second bend between the second port and the microwave absorbing termination, and wherein each of the first bend and the second bend is defined by a respective smooth curved surface.

16. The system as in claim 15, wherein each said smooth curved surface is defined by a constant radius.

17. The system as in claim 16, wherein the constant radius is less than a width of the respective first dual mode transmission line and second dual mode transmission line.

18. A dual mode coupler for use in a radio and antenna system having a first microwave radio, a second microwave radio, and an antenna, said coupler comprising:

a first end;

a second end opposite the first end;

a first side extending between and generally transverse to the first end and the second end;

a second side opposite the first side and extending between and generally transverse to the first end and the second end;

a first port at which microwave signals are receivable from or conveyable to the first microwave radio;

a second port at which microwave signals are receivable from or conveyable to the second microwave radio;

a third port at which microwave signals are receivable from or conveyable to the antenna;

a first dual mode transmission line extending between the first port and the third port; and a second dual mode transmission line extending between the second port and a microwave absorbing termination, wherein the first port is defined in the first side, wherein the third port is defined in the second end, wherein the second port is defined in the second side, and wherein, the first dual mode transmission line is coupled to the second dual mode transmission line so that microwave signals in either of the first dual mode transmission line and the second dual mode transmission line propagate microwave signals in the other of the first dual mode transmission line and the second dual mode transmission line.

19. A coupler as in claim 18, comprising a wall between the first dual mode transmission line and the second dual mode transmission line, wherein the wall defines at least two through slots that open to both the first dual mode transmission line and the second dual mode transmission line and that are aligned with respect to each other in a direction transverse to a direction of propagation of the microwave signals in the first dual mode transmission line and the second dual mode transmission line.

20. The coupler as in claim 18, wherein the first dual mode transmission line has a first bend between the first port and the third port, wherein the second dual mode transmission line has a second bend between the second port and the microwave absorbing termination, and wherein each of the first bend and the second bend is defined by a respective smooth curved surface.

21. The coupler as in claim 20, wherein each said smooth curved surface is defined by a constant radius.

22. The coupler as in claim 21, wherein the constant radius is less than a width of the respective first dual mode transmission line and second dual mode transmission line.

23. A radio and antenna system, comprising:

a first microwave radio;

a second microwave radio;

an antenna; and a dual mode coupler comprising a first dual mode transmission line extending between a first port and a third port and a second dual mode transmission line extending between a second port and a microwave absorbing termination, wherein the second dual mode transmission line comprises a first elongated section between the second port and a bend in the second dual mode transmission line and a second elongated section between the bend and the microwave absorbing termination, wherein the first microwave radio is coupled to the first port so that the first microwave radio is operable to at least one of outputting microwave signals into and receiving microwave signals from the first dual mode transmission line by the first port, wherein the second microwave radio is coupled to the second port so that the second microwave radio is operable to at least one of outputting microwave signals into and receiving microwave signals from the second dual mode transmission line by the second port, wherein the antenna is coupled to the third port so that the antenna is operable to at least one of outputting microwave signals into and receiving microwave signals from the first dual mode transmission line by the third port, and wherein the first dual mode transmission line is coupled to the second dual mode transmission line so that microwave signals in either of the first dual mode transmission line and the second dual mode transmission line propagate microwave signals in the other of the first dual mode transmission line and the second dual mode transmission line.

24. The system as in claim 23, wherein the bend turns the second dual mode transmission line so that the first elongated section and the second elongated section are parallel to each other.

25. The system as in claim 24, wherein each of the first microwave radio and the second microwave radio is a transceiver that outputs microwave signals modulated to carry information and receives microwave signals modulated to carry information.

26. A dual mode coupler for use in a radio and antenna system having a first microwave radio, a second microwave radio, and an antenna, said coupler comprising:

a first port at which microwave signals are receivable from or conveyable to the first microwave radio;

a second port at which microwave signals are receivable from or conveyable to the second microwave radio;

a third port at which microwave signals are receivable from or conveyable to the antenna;

a first dual mode transmission line extending between the first port and the third port; and a second dual mode transmission line extending between the second port and a microwave absorbing termination, wherein the second dual mode transmission line comprises a first elongated section between the second port and a bend in the second dual mode transmission line and a second elongated section between the bend and the microwave absorbing termination, and wherein the first dual mode transmission line is coupled to the second dual mode transmission line so that microwave signals in either of the first dual mode transmission line and the second dual mode transmission line propagate microwave signals in the other of the first dual mode transmission line and the second dual mode transmission line.

27. The coupler as in claim 26, wherein the bend turns the second dual mode transmission line so that the first elongated section and the second elongated section are parallel to each other.

* * * * *